United States Patent
Han et al.

(10) Patent No.: US 12,506,261 B2
(45) Date of Patent: Dec. 23, 2025

(54) ANTENNA DEVICE FOR VEHICLE, CONTROL METHOD THEREFOR AND RECORDING MEDIUM FOR STORING PROGRAM FOR PERFORMING METHOD

(71) Applicant: Samsung Electronics Co., Ltd., Suwon-si (KR)

(72) Inventors: Kiseung Han, Suwon-si (KR); Woong Lee, Suwon-si (KR); Jeseung Oh, Suwon-si (KR); Yongjoon Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 18/149,341

(22) Filed: Jan. 3, 2023

(65) Prior Publication Data

US 2023/0141292 A1    May 11, 2023

Related U.S. Application Data

(63) Continuation of application No. PCT/KR2021/008501, filed on Jul. 5, 2021.

(30) Foreign Application Priority Data

Jul. 9, 2020  (KR) ........................ 10-2020-0084935

(51) Int. Cl.
  *H01Q 3/36*   (2006.01)
  *G01V 11/00*  (2006.01)
  *H01Q 1/32*   (2006.01)

(52) U.S. Cl.
  CPC ............. *H01Q 3/36* (2013.01); *G01V 11/002* (2013.01); *H01Q 1/3275* (2013.01)

(58) Field of Classification Search
  CPC ....... H01Q 3/36; H01Q 1/3275; G01V 11/002
  (Continued)

(56) References Cited

U.S. PATENT DOCUMENTS 6,220,627 B1 *  4/2001  Stanley ................ B60R 21/015
                                                    701/45
9,179,299 B2    11/2015  Schlub et al.
(Continued)

FOREIGN PATENT DOCUMENTS

JP   H11-163616 A     6/1999
JP   2002-325082 A   11/2002
(Continued)

OTHER PUBLICATIONS

Korean Office Action with English translation dated Jul. 25, 2024; Korean Appln. No. 10-2020-0084935.
(Continued)

*Primary Examiner* — William Kelleher
*Assistant Examiner* — Samarina Makhdoom
(74) *Attorney, Agent, or Firm* — Jefferson IP Law, LLP

(57) ABSTRACT

A vehicle antenna apparatus installed in a vehicle is provided. The vehicle antenna apparatus includes an array antenna including a plurality of antenna elements, and a processor configured to perform at least one instruction. The processor is configured to obtain, based on a sensing result of a sensor for sensing a position of a user riding in the vehicle, information about the position of the user, adjust, based on the information about the position of the user, a phase of at least one radio wave signal such that a position of a radiation pattern formed by the at least one radio wave signal output from the plurality of antenna elements and the position of the user riding in the vehicle vary from each other, and control the array antenna to output the at least one phase-adjusted radio wave signal.

18 Claims, 12 Drawing Sheets

(58) Field of Classification Search
USPC .......................................................... 342/372
See application file for complete search history.

(56) References Cited

U.S. PATENT DOCUMENTS

| | | | |
|---|---|---|---|
| 9,337,548 | B2 | 5/2016 | Montgomery et al. |
| 9,488,493 | B2 | 11/2016 | Macneille et al. |
| 10,175,340 | B1* | 1/2019 | Abari ................... G01S 13/865 |
| 10,251,137 | B2 | 4/2019 | Kim et al. |
| 10,433,310 | B2 | 10/2019 | Kim et al. |
| 10,893,386 | B2 | 1/2021 | Yamaguchi et al. |
| 2001/0033249 | A1 | 10/2001 | Endo et al. |
| 2014/0038662 | A1 | 2/2014 | Alberth, Jr. et al. |
| 2017/0201303 | A9 | 7/2017 | Noh et al. |
| 2018/0031693 | A1* | 2/2018 | Zielinski ................ H01Q 19/17 |
| 2018/0035433 | A1* | 2/2018 | Zielinski ................ H04W 8/08 |
| 2018/0160377 | A1* | 6/2018 | Abramsky .......... H04W 52/283 |
| 2018/0166775 | A1* | 6/2018 | Apostolos ................ H01Q 9/32 |
| 2018/0191189 | A9 | 7/2018 | Leabman |
| 2019/0058245 | A1* | 2/2019 | Safavi Naeini ........ H01Q 3/267 |
| 2019/0089203 | A1* | 3/2019 | Leabman ................ H02J 50/60 |
| 2020/0076488 | A1* | 3/2020 | Brunel ................... H04B 7/063 |

FOREIGN PATENT DOCUMENTS

| | | | |
|---|---|---|---|
| JP | 2006-109131 | A | 4/2006 |
| JP | 4029167 | B2 | 1/2008 |
| JP | 2010011143 | A * | 1/2010 |
| JP | 2013-211626 | A | 10/2013 |
| KR | 10-2012-0015352 | A | 2/2012 |
| KR | 10-2016-0081756 | A | 7/2016 |
| KR | 10-2016-0112551 | A | 9/2016 |
| KR | 10-2264396 | B1 | 6/2021 |
| WO | WO-2019026076 | A1 * | 2/2019 ............ G01S 13/56 |
| WO | 2020/003628 | A1 | 1/2020 |

OTHER PUBLICATIONS

International Search Report with Written Opinion dated Oct. 15, 2021; International Appln No. PCT/KR2021/008501.
Extended European Search Report dated Nov. 6, 2023; European Appln. No. 21838774.4-1206 / 4167383 PCT/KR2021008501.
Indian Office Action dated Dec. 4, 2023; Indian Appln. No. 202317006988.
Korean Office Action dated Mar. 24, 2025, issued in Korean Application No. 10-2020-0084935.

* cited by examiner

ANTENNA DEVICE FOR VEHICLE, CONTROL METHOD THEREFOR AND RECORDING MEDIUM FOR STORING PROGRAM FOR PERFORMING METHOD

CROSS-REFERENCE TO RELATED APPLICATION(S)

This application is a continuation application, claiming priority under § 365(c), of an International application No. PCT/KR2021/008501, filed on Jul. 5, 2021, which is based on and claims the benefit of a Korean patent application number 10-2020-0084935, filed on Jul. 9, 2020, in the Korean Intellectual Property Office, the disclosure of which is incorporated by reference herein in its entirety.

BACKGROUND

1. Field

The disclosure relates to a vehicle antenna apparatus, a method of controlling the vehicle antenna apparatus, and a recording medium having stored therein a program for performing the method. More particularly, the disclosure relates to a vehicle antenna apparatus including an antenna for adjusting a transmission/reception direction of a transmission/reception signal, a method of controlling the vehicle antenna apparatus, and a recording medium having stored therein a program for performing the method.

2. Description of Related Art

Various functions have been developed and applied to satisfy demand and further increase convenience of a user using a vehicle.

For example, vehicle apparatuses for providing the user with radio, television (TV), content, or various information necessary for driving have been developed. Information that may be provided to the user may be received by the vehicle through wireless communication. Thus, in order to provide various information to the user, an antenna for performing wireless communication should be necessarily provided in the vehicle. The antenna may be installed inside or outside the vehicle.

The installation position of the antenna may directly affect the performance of the antenna, the stability of the vehicle, and the aesthetic of the vehicle. Recently, the antenna is mostly installed in a shark-fin module located on the glass or roof of the vehicle.

When the antenna is installed on the glass of the vehicle, the antenna may also be damaged when the glass is damaged due to an external impact, and the length of a cable for connecting the antenna with a printed circuit board (PCB) module may increase. Also, when two or more antennas are installed or mounted on the glass to support diversity, there may be an issue of isolation between the antennas.

Because the shark-fin module has a shape exposed to the outside of the vehicle, it may also have a high risk of damage due to an external impact. Also, due to the small size of the shark-fin module, the radiation capability (or broadcast reception capability) of the antenna may become degraded because the size of the antenna is also reduced, and the number of shark-fin modules should be increased when multiple antennas are to be installed to receive various broadcast signals.

Also, because an antenna apparatus is an apparatus for transmitting/receiving radio wave signals for wireless communication, there may be an issue of electromagnetic wave generation.

Therefore, it may be necessary to provide an antenna apparatus capable of minimizing an issue of electromagnetic wave generation while overcoming the above problems of the antenna being located on the glass or roof.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a vehicle antenna apparatus capable of minimizing the influence of an electromagnetic wave on a user while reducing the risk of damage due to an external impact, a method of controlling the vehicle antenna apparatus, and a recording medium having stored therein a program for performing the method.

Additional aspects will be set forth in part in the description which follows and, in part, will be apparent from the description, or may be learned by practice of the presented embodiments.

In accordance with an aspect of the disclosure, a vehicle antenna apparatus installed in a vehicle is provided. The vehicle antenna apparatus includes an array antenna including a plurality of antenna elements, and at least one processor configured to perform at least one instruction. The at least one processor, when executing the at least one instruction, is further configured to obtain, based on a sensing result of a sensor for detecting a position of a user riding in the vehicle, information about the position of the user, adjust, based on the information about the position of the user, a phase of at least one radio wave signal such that a position of a radiation pattern formed by the at least one radio wave signal output from the plurality of antenna elements and the position of the user riding in the vehicle vary from each other, and control the array antenna to output the at least one phase-adjusted radio wave signal.

Also, the at least one processor, when executing the at least one instruction, may be further configured to adjust the phase of the at least one radio wave signal such that the radiation pattern and the user may not overlap each other.

Also, the at least one processor, when executing the at least one instruction, may be further configured to control such that a radio wave radiation direction of the array antenna is changed by adjusting a phase of each of a plurality of radio wave signals to be respectively output from the plurality of antenna elements based on the information about the position of the user.

Also, the at least one processor, when executing the at least one instruction, may be further configured to determine, based on the information about the position of the user, whether the position of the radiation pattern the position of the user overlap each other, and maintain the phase of the at least one radio wave signal at a previous set value when the position of the radiation pattern and the position of the user do not overlap each other as a result of the determining.

Also, the at least one processor, when executing the at least one instruction, may be further configured to synchronize a first coordinate system that is a three-dimensional coordinate system for representing the position of the user and a second coordinate system that is a three-dimensional coordinate system for representing a position of the at least one radio wave signal, and compare a first coordinate value corresponding to the position of the user and a second coordinate value corresponding to the radiation pattern by using the synchronized first coordinate system and second coordinate system.

Also, the vehicle antenna apparatus may further include a sensor configured to detect the position of the user riding in the vehicle.

Also, the sensor may include at least one of a time-of-flight (TOF) sensor, a light detection and ranging (LIDAR) sensor, a radio detection and ranging (RADAR) sensor, a plurality of proximity sensors attached at different positions in the vehicle, and a seat sensor located in the vehicle.

Also, the array antenna may be formed as a phased array antenna located under a metal panel of the vehicle.

Also, the at least one processor, when executing the at least one instruction, may be further configured to determine, based on the sensing result of the sensor, whether the position of the user is changed. The at least one processor, when executing the at least one instruction, may be further configured to readjust, when it is determined that the position of the user is changed, the phase of the at least one radio wave signal such that the position of the radiation pattern and the changed position of the user may not overlap each other.

Also, the at least one processor, when executing the at least one instruction, may be further configured to determine whether the position of the user is changed by a threshold value or more, and readjust, when it is determined that the position of the user is changed by the threshold value or more, the phase of the at least one radio wave signal such that the position of the radiation pattern and the changed position of the user may vary from each other.

Also, the at least one processor, when executing the at least one instruction, may be further configured to adjust, when an electromagnetic wave absorption rate corresponding to an area where the radiation pattern and the user overlap each other is greater than a limit value, the phase of the at least one radio wave signal such that the electromagnetic wave absorption rate corresponding to the area may be less than or equal to the limit value.

In accordance with another aspect of the disclosure, a method of controlling a vehicle antenna apparatus including an array antenna including a plurality of antenna elements and installed in a vehicle is provided. The method includes obtaining, based on a sensing result of a sensor for detecting a position of a user riding in the vehicle, information about the position of the user, adjusting, based on the information about the position of the user, a phase of at least one radio wave signal such that a position of a radiation pattern formed by the at least one radio wave signal output from the plurality of antenna elements and the position of the user riding in the vehicle vary from each other, and controlling the array antenna to output the at least one phase-adjusted radio wave signal.

Also, the adjusting of the phase may include adjusting the phase of the at least one radio wave signal such that the radiation pattern and the user may not overlap each other.

Also, the method may further include synchronizing a first coordinate system that is a three-dimensional coordinate system for representing the position of the user and a second coordinate system that is a three-dimensional coordinate system for representing a position of the at least one radio wave signal, and comparing a first coordinate value corresponding to the position of the user and a second coordinate value corresponding to the radiation pattern by using the synchronized first coordinate system and second coordinate system.

Also, the adjusting of the phase may include adjusting, based on the information about the position of the user, a phase of at least one of a plurality of radio wave signals respectively output from the plurality of antenna elements, to perform control such that a radio wave radiation direction of the array antenna may be changed.

Also, the method may further include determining, based on the information about the position of the user, whether the position of the radiation pattern the position of the user overlap each other, and maintaining the phase of the at least one radio wave signal at a previous set value when the position of the radiation pattern and the position of the user do not overlap each other as a result of the determining.

Also, the method may further include determining, based on the sensing result of the sensor, whether the position of the user is changed, and readjusting, when it is determined that the position of the user is changed, the phase of the at least one radio wave signal such that the position of the radiation pattern and the changed position of the user may not overlap each other.

Also, the adjusting of the phase may further include adjusting, when an electromagnetic wave absorption rate corresponding to an area where the radiation pattern and the user overlap each other is greater than a limit value, the phase of the at least one radio wave signal such that the electromagnetic wave absorption rate corresponding to the area may be less than or equal to the limit value.

Also, a non-transitory computer-readable storage medium has stored therein a program including at least one instruction to perform a method of controlling a vehicle antenna apparatus. Herein, the method may be a method of controlling a vehicle antenna apparatus including an array antenna including a plurality of antenna elements and installed in a vehicle, the method including obtaining, based on a sensing result of a sensor for detecting a position of a user riding in the vehicle, information about the position of the user, adjusting, based on the information about the position of the user, a phase of at least one radio wave signal such that a position of a radiation pattern formed by the at least one radio wave signal output from the plurality of antenna elements and the position of the user riding in the vehicle vary from each other, and controlling the array antenna to output the at least one phase-adjusted radio wave signal.

According to embodiments described herein, a vehicle antenna apparatus, a method of controlling the vehicle antenna apparatus, and a recording medium having stored therein a program for performing the method may minimize the influence of an electromagnetic wave on a user while reducing the risk of damage due to an external impact.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
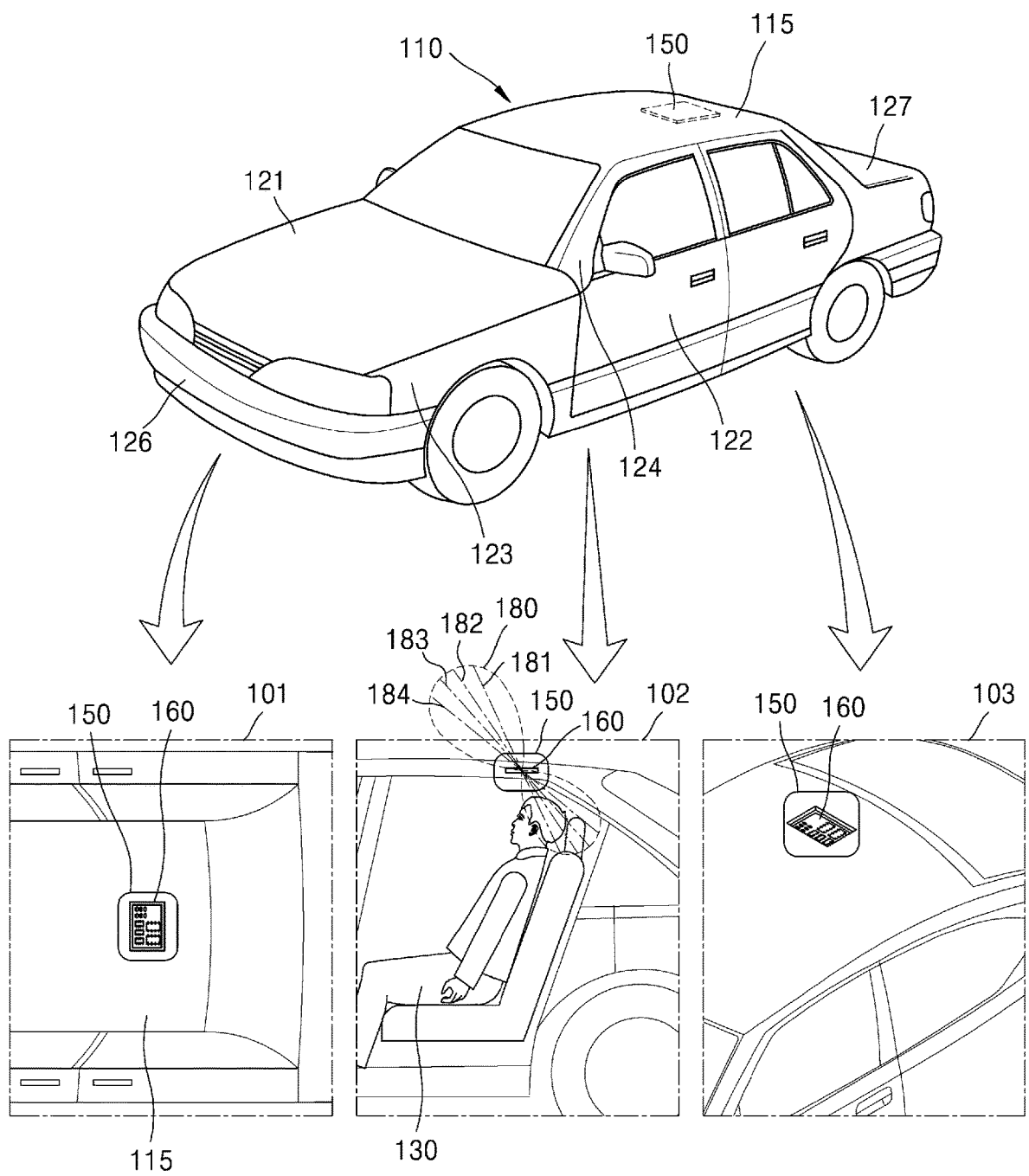
FIG. 1 is a diagram illustrating a vehicle in which an antenna apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, when an element is referred to as being "connected" to another element, it may be "directly connected" to the other element or may be "electrically connected" to the other element with one or more intervening elements therebetween. Also, when something is referred to as "including" a component, another component may be further included unless specified otherwise.

The phrases "in some embodiments" or "in an embodiment" appearing in various places in the specification may not necessarily all refer to the same embodiment.

Some embodiments may be represented by functional block configurations and various processing operations. Some or all of these functional blocks may be implemented by any number of hardware and/or software components that execute particular functions. For example, the functional blocks of the disclosure is implemented by one or more processors or microprocessors or may be implemented by circuit components for an intended function. Also, for example, the functional blocks of the disclosure is implemented in various programming or scripting languages. The functional blocks may be implemented as an algorithm executed in one or more processors. Also, the disclosure may employ the related art for electronic environment setting, signal processing, and/or data processing. Terms such as modules and components may be broadly used and are not limited to mechanical and physical components.

Also, the connection lines or connection members between the elements illustrated in the drawings are merely examples of functional connections and/or physical or logical connections. In an actual apparatus, the connections between elements may be represented by various functional connections, physical connections, or logical connections that are replaceable or added.

Also, the expression "at least one of A, B, and C" may refer to any one of "A", "B", "C", "A and B", "A and C", "B and C", and "A, B, and C".

A vehicle antenna apparatus, a method of controlling the vehicle antenna apparatus, and a recording medium having stored therein a program for performing the method according to embodiments will be described in detail with reference to the accompanying drawings. In the accompanying drawings, like components are illustrated by using like reference symbols. Also, throughout the detailed description, like components are denoted by like terms.

Unlike the above antenna located on the glass or roof, the antenna apparatus according to an embodiment may not be exposed to the outside of the vehicle. Particularly, the antenna apparatus according to another embodiment may be located inside the vehicle, which is, inside a metal panel forming the body of the vehicle.

The antenna apparatus according to another embodiment may refer to an electronic apparatus that includes an antenna array including a plurality of antenna elements for transmitting/receiving radio waves, to generate and control radio waves such that the radio waves may be transmitted in a target direction or to a destination. Also, the vehicle antenna apparatus may be referred to as an antenna apparatus, an antenna, an antenna module, or an antenna system.

A vehicle antenna apparatus, a method of controlling the vehicle antenna apparatus, and a recording medium having stored therein a program for performing the method according to embodiments may minimize the influence of an electromagnetic wave on the user while reducing the risk of damage due to an external impact.

In particular, a vehicle antenna apparatus, a method of controlling the vehicle antenna apparatus, and a recording medium having stored therein a program for performing the method according to embodiments may minimize the absorption of an electromagnetic wave on the user in relation to an electromagnetic wave generated in the antenna apparatus located in the vehicle.

Embodiments will be described below in detail with reference to the accompanying drawings.

The position at which the antenna apparatus according to an embodiment is installed will be described below in detail with reference to FIG. 1.

FIG. 1 is a diagram illustrating a vehicle in which an antenna apparatus according to an embodiment of the disclosure.

Referring to FIG. 1, a vehicle electronic apparatus 160 may be installed under an area 150 on a metal panel (e.g., a roof panel 115) forming the body of a vehicle 110. In particular, the area 150 of the metal panel (e.g., 115) may be opened such that the vehicle electronic apparatus 160 may be arranged on a lower portion of the area 150 in the vehicle 110. Also, the area 150 may not be formed of a metal material. In particular, the area 150 on the metal panel (e.g., 115) may be formed of a material (e.g., a non-metallic material) that does not block radio waves.

Referring to FIG. 1, a case where the antenna apparatus is installed in an area 150 over the vehicle 110 is illustrated as an example; however, like an antenna installed in the shark-fin module or glass of the vehicle 110, the antenna apparatus may be installed in any space or area inside the vehicle 110 that is not directly exposed to the outside of the vehicle 110.

In particular, the vehicle electronic apparatus 160 may be installed in a lower area or an inner area of at least one of a bonnet panel 121, a door panel 122, a fender panel 123, a pillar panel 124, a roof panel 115, a bumper panel 126, and a trunk panel 127 of the vehicle.

The door panel 122 may include not only a front door panel on the driver seat side illustrated in FIG. 1 but also a rear door panel on the driver seat side, a front door panel on the passenger seat side, and a rear door panel on the passenger seat side. Also, the fender panel 123 may include not only a front fender panel on the driver seat side illustrated in FIG. 1 but also a rear fender panel on the driver seat side, a front fender panel on the passenger seat side, and a rear fender panel on the passenger seat side. Also, the pillar panel 124 may include not only a front pillar panel on the driver seat side illustrated in FIG. 1 but also a rear pillar panel on the driver seat side, a front pillar panel on the passenger seat side, and a rear pillar panel on the passenger seat side. Also, the bumper panel 126 may include a rear bumper panel as well as a front bumper panel illustrated in FIG. 1.

Hereinafter, as illustrated in FIG. 1, a case where the vehicle antenna apparatus 160 is installed under a certain area 150 over the roof panel 115 of the vehicle 110 will be described as an example.

Particularly, a first image 101 may represent an external cross-section of the vehicle 110 when the vehicle 110 is viewed in a vertical direction on the upper side of the vehicle 110. A second image 102 may represent a cross-section of the vehicle 110 when the vehicle 110 is viewed in a horizontal direction on the side of the vehicle 110. Also, a third image 103 may represent a cross-section of the vehicle 110 when the vehicle 110 is viewed in a diagonal direction on the upper side of the vehicle 110.

Referring to the first image 101, the area 150 of the roof panel 115 may be cut, and the vehicle electronic apparatus 160 may be installed such that the vehicle electronic apparatus 160 may be arranged on the lower portion of the area 150 in the vehicle 110. In particular, after cutting the area 150 on the roof panel 115 and installing the vehicle electronic apparatus 160, the cut area 150 of the roof panel 115 may be shielded with a material (e.g., a non-metallic material) that does not block radio waves.

Also, referring to the second image 102, an in-vehicle space in which a user 130 may be accommodated may be formed under the lower end of the roof panel 115.

When the vehicle electronic apparatus 160 is installed in the form attached to the lower end of the roof panel 115, a radio wave blocking material (e.g., a metallic material) may not be located between the vehicle electronic apparatus 160 and the user 130 located therein. Thus, an electromagnetic wave generated in the vehicle electronic apparatus 160 may harmfully affect the human body of the user 130.

In particular, the vehicle electronic apparatus 160 may transmit/receive radio waves for wireless communication, and an electromagnetic wave issue on the human body may occur due to the transmitted/received radio waves. In embodiments described herein, electromagnetic signals transmitted/received by the vehicle electronic apparatus 160 will be referred to as "radio waves" or "radio wave signals".

When the vehicle electronic apparatus 160 transmits/receives radio waves in the front direction of the vehicle, a radiation pattern 180 of radio wave signals may be formed by transmitted/received radio wave signals 181, 182, 183, and 184 as illustrated in the second image 102. Also, the radiation pattern 180 of the radio wave signals may be generated both in the direction in which the radio waves are transmitted and in the opposite direction thereof.

Thus, among the radio waves forming the radiation pattern 180, a portion radiated into the vehicle 110 may be absorbed by the human body of the user 130 riding in the vehicle 110.

In particular, an electromagnetic wave absorption rate on the radio waves transmitted/received by the vehicle electronic apparatus 160 may be problematic. Electromagnetic waves generated when using electronic apparatuses (mobile phones, computers, microwave ovens, antenna apparatuses, or the like) in daily life may be absorbed by the human or animal body. A value expressed as a number of the amount of electromagnetic waves absorbed by the human or animal body will be referred to as a specific absorption rate (SAR).

The specific absorption rate (SAR) may refer to the amount of electromagnetic wave energy absorbed by the unit mass (1 kg or 1 g) of the human body per unit time, and the units thereof may be W/kg or mW/g.

When the human body is exposed to an electromagnetic wave with a low frequency (particularly, a low frequency of about 1 hertz (Hz) to about 100 kilohertz (KHz)), nerves thereof may be stimulated (stimulating action) due to the current induced in the human body. When the human body is exposed to an electromagnetic wave with a high frequency (a high frequency of about 100 KHz to about 10 gigahertz (GHz)), a thermal action of increasing the body temperature may occur. As such, when the human body is exposed to electromagnetic waves, the human body may be negatively affected, such as the nerves of the human body being stimulated or the body temperature being increased.

Thus, an embodiment may provide a vehicle antenna apparatus capable of minimizing an electromagnetic wave absorption rate on the user while not being exposed to the outside of the vehicle, unlike the antennas located on the glass or roof as described above.

Also, the antenna apparatus according to another embodiment may be formed to be integrated with a vehicle communication module (not shown). The vehicle communication module (not shown) may be referred to as a transmission control unit (TCU). The TCU may be a component controlling transmission/reception of data in the vehicle and may control communication between the vehicle and an external electronic apparatus (e.g., a server, mobile device, or the like). The antenna apparatus according to another embodiment may be installed in the vehicle communication module or may be formed to be integrated with the vehicle communication module.

Also, the vehicle antenna apparatus according to another embodiment may be a directional antenna apparatus supporting millimeter waves (mmWave). The millimeter waves may be radio wave signals having a frequency band of about 30 GHz to about 300 GHz and may have a wavelength ranging from about 1 mm to about 10 mm. The vehicle antenna apparatus according to another embodiment may precisely adjust the form and direction of transmitted/received radio wave signals by transmitting/receiving radio waves or millimeter waves.

Hereinafter, the components of the vehicle antenna apparatus according to an embodiment will be described in detail with reference to FIGS. 2 and 3.

Figure 2:
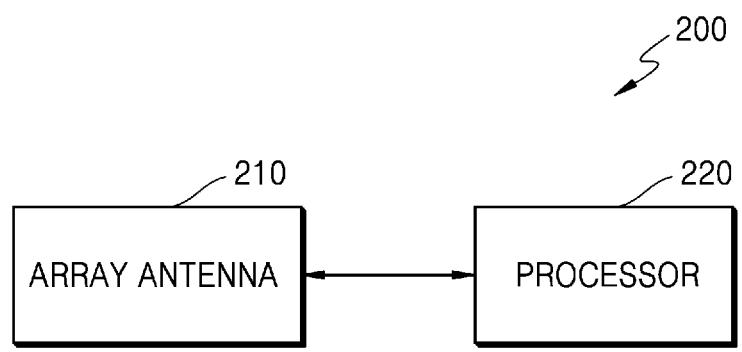
FIG. 2 is a block diagram illustrating an antenna apparatus according to an embodiment of the disclosure.

FIG. 2 is a block diagram illustrating an antenna apparatus according to an embodiment of the disclosure. Because a vehicle electronic apparatus 200 illustrated in FIG. 2 corresponds to the vehicle electronic apparatus 160 described above with reference to FIG. 1, redundant descriptions thereof will be omitted for conciseness.

Referring to FIG. 2, the vehicle electronic apparatus 200 according to an embodiment may be a vehicle antenna apparatus installed in a vehicle and may include an array antenna 210 and a processor 220.

The array antenna 210 may include a plurality of antenna elements. Each of the plurality of antenna elements may transmit and/or receive radio wave signals.

In particular, the array antenna 210 may be formed as a phased array antenna located under a metal panel of the vehicle. The phased array antenna may refer to an antenna in which each of the plurality of antenna elements included in the array antenna 210 may be arranged in a linear direction and the phase of a radio wave signal output from each of the plurality of antenna elements may be adjusted.

The array antenna 210 will be described below in detail with reference to FIG. 5.

The processor 220 may execute at least one instruction. The processor 220 may execute at least one instruction to perform the following operations.

In particular, the processor 220 may obtain information about the position of the user based on the sensing result of a sensor (not shown) for detecting the position of the user riding in the vehicle. Based on the information about the position of the user, the processor 220 may adjust the phase of at least one radio wave signal such that the position of a radiation pattern formed by at least one radio wave signal output from a plurality of antenna elements and the position of the user riding in the vehicle may vary from each other. The processor 220 may control the array antenna 210 to output at least one phase-adjusted radio wave signal. The phase adjustment may refer to a "phase shift" operation of shifting the phase of a radio wave signal.

The position of the radiation pattern may refer to a position in a space where the radiation pattern is located (or arranged) or a certain area in the space.

In particular, the processor 220 may adjust the phase of at least one radio wave signal output from a plurality of antenna elements such that a radiation pattern may be formed at a position different from the position of the user.

The processor 220 may execute at least one instruction to perform control such that an intended operation may be performed.

In particular, the processor 220 may include an internal memory (not shown) and at least one processor (not shown) that executes at least one stored program. The internal memory (not shown) of the processor 220 may store one or more instructions. The processor 220 may execute a certain operation by executing at least one of the one or more instructions stored in the internal memory (not shown).

In particular, the processor 220 may include a random-access memory (RAM) (not shown) that stores a signal or data input from outside or is used as a storage area corresponding to various operations performed by the vehicle electronic apparatus 200, a read-only memory (ROM) (not shown) storing a plurality of instructions and/or a control program for controlling the vehicle electronic apparatus 200, and at least one processor (not shown).

Alternatively, the processor 220 may be implemented as a system-on-chip (SoC) including a combination of a core (not shown) and a graphics processing unit (GPU) (not shown). Alternatively, the processor 220 may include a single core or a multi-core. For example, the processor 220 includes a dual core, a triple core, a quad core, a hexa core, an octa core, a deca core, a dodeca core, a hexadecimal core, and/or the like.

Also, the processor 220 may include components for implementing a hardware platform (e.g., application processor (AP), memory, and/or the like) and components for implementing a software platform (e.g., operating system (OS) program, automotive safety software for controlling the phase of a radio wave signal output from the array antenna 210, and/or application).

In an embodiment, at least one of the operations performed by the processor 220 may be performed by using artificial intelligence (AI) technology. At least one operation performed by using AI technology will be described below in detail with reference to FIG. 10.

Figure 3:
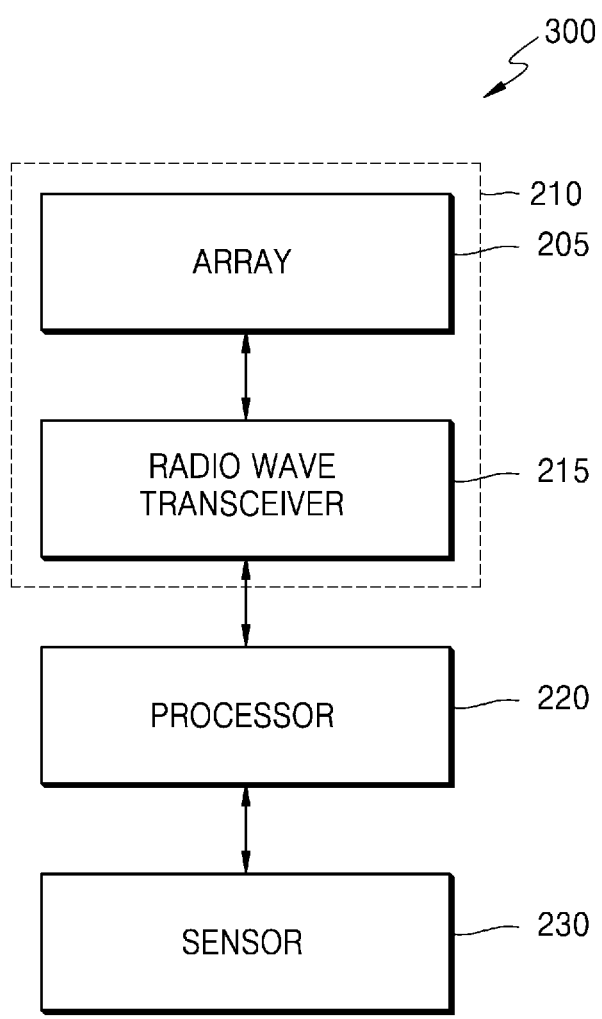
FIG. 3 is a block diagram illustrating the antenna apparatus of FIG. 2 in more detail according to an embodiment of the disclosure.

FIG. 3 is a block diagram illustrating the antenna apparatus of FIG. 2 in more detail according to an embodiment of the disclosure.

Referring to FIG. 2, a vehicle electronic apparatus 300 of FIG. 3 may correspond to the vehicle electronic apparatus 200 described above with reference to FIG. 2. Therefore, in describing the vehicle electronic apparatus 300, redundant descriptions with those of the vehicle electronic apparatuses 160 and 200 will be omitted for conciseness. Also, in describing the vehicle electronic apparatus 300 illustrated in FIG. 3, the same components as those described above with reference to FIG. 2 will be denoted by the same reference symbols and terms.

The vehicle electronic apparatus 300 may further include a sensor 230, compared to the vehicle electronic apparatus 200.

The sensor 230 may sense the position of the user riding in the vehicle. In particular, the sensor 230 may obtain a signal for sensing the position of the user riding in the vehicle. Also, the sensor 230 may be a sensor for obtaining the position of the user riding in the vehicle as three-dimensional data. The signal obtained by the sensor 230 may be data directly representing the position of the user (e.g., depth information about the user or the like). Alternatively, the sensor 230 may include data for three-dimensionally inferring the position of the user.

The processor 220 may receive a sensing signal obtained by the sensor 230 and obtain information about the position of the user riding in the vehicle based on the received sensing signal (or sensing result).

In particular, the sensor 230 may obtain signals necessary to obtain the position of the user riding in the vehicle as a three-dimensional coordinate value in the three-dimensional space.

In particular, the sensor 230 may include at least one of a time-of-flight (TOF) sensor, a light detection and ranging (LIDAR) sensor, a radio detection and ranging (RADAR) sensor, a plurality of proximity sensors attached at different positions in the vehicle, and a seat sensor located in the vehicle.

For example, when the sensor 230 includes a ToF sensor, the sensor 230 obtains information about the position of the user (e.g., depth information about the user or the like) as three-dimensional information by calculating the corresponding distance by measuring the time taken for light to be reflected back after being shot into the space in the vehicle.

As another example, the sensor 230 includes a plurality of proximity sensors attached at a plurality of different positions in the vehicle. In this case, the sensor 230 may obtain a signal indicating whether an object approaching each of the plurality of proximity sensors is sensed. Then, the processor 220 may receive sensing results respectively obtained by each of the plurality of proximity sensors and obtain information indicating in which area of the vehicle the user is located by combining the received sensing results.

As another example, the sensor 230 may include a plurality of seat sensors respectively attached to the seats in the vehicle. The seat sensor may sense the pressure or weight pressing a seat to obtain a signal for determining whether the user is located in the seat. Then, the processor 220 may receive the sensing results respectively obtained by the plurality of seat sensors and obtain information indicating in which seat of the vehicle or in an area corresponding to which seat the user is located by combining the received sensing results.

Also, the sensor 230 may be formed to be included in the vehicle electronic apparatus 300 or may be formed as a separate apparatus from the vehicle electronic apparatus 300. When the vehicle electronic apparatus 300 and the sensor 230 are formed as separate apparatuses, the sensor 230 and the processor 220 of the vehicle electronic apparatus 300 may receive the sensing results from the sensor 230 through wired/wireless communication. Also, the sensor 230 may be formed to be included in the vehicle. For example, the vehicle includes seat sensors to control the operations of driver seat and passenger seat airbags. In this case, the vehicle electronic apparatus 300 may receive and use the sensing results from the seat sensors included in the vehicle.

When the processor 220 receives a sensing result from an external sensor (not shown), the vehicle electronic apparatus 300 may further include a wired/wireless communication interface (not shown) for communicating with the external sensor (not shown). In particular, the communication interface (not shown) may include a wired cable for performing wired communication. Alternatively, the communication interface (not shown) may include a wireless communication module for performing wireless communication.

Also, in an embodiment, the array antenna 210 may include an array 205 including a plurality of antenna elements and a radio wave transceiver 215 for generating and/or processing signals transmitted/received through the array 205. Also, the array antenna 210 may be referred to as an antenna module.

The array 205 may refer to a set in which a plurality of antenna elements transmitting or receiving radio wave signals are arranged. Because the array 205 is a set of antenna elements in which a plurality of antenna elements are arranged, it may be referred to as an array antenna (antenna array).

Each of the plurality of antenna elements included in the array 205 may receive an input of a radio wave signal having a certain signal magnitude (or gain), a certain phase, and a certain frequency from the radio wave transceiver 215 and radiate a radio wave corresponding to the input radio wave signal. Alternatively, each of the plurality of antenna elements included in the array 205 may receive a radio wave corresponding to a certain signal magnitude (or gain), a certain phase, and a certain frequency and transmit a radio wave signal corresponding to the received radio wave to the radio wave transceiver 215.

In another embodiment, the array 205 may include 4*4=16 antenna elements including 4 antenna elements arranged in the row direction and 4 antenna elements arranged in the column direction. Also, as another example, the array 205 may include 8*8=64 antenna elements. The number and arrangement of antenna elements included in the array 205 may vary according to various embodiments.

A plurality of antenna elements arranged together in the direction of at least one of the row and the column may be referred to as an "antenna element group". The array 205 may include a plurality of antenna element groups described above. For example, the array 205 has a form in which four antenna element groups each including 4*4=16 antenna elements are arranged together. Alternatively, the array 205 may have a form including one antenna element group including 8*8=16 antenna elements.

The radio wave transceiver 215 may generate and/or process signals transmitted/received through the array 205. Particularly, the radio wave transceiver 215 may generate a radio wave signal having a certain phase and a certain frequency. The radio wave signal generated by the radio wave transceiver 215 may be output through the array 205. Also, when a radio wave having a certain phase and a certain frequency is received by the array 205, the radio wave transceiver 215 may receive and process a signal corresponding to the radio wave received by the array 205.

Particularly, the radio wave transceiver 215 may process a radio wave signal to have a certain phase and frequency. Particularly, for transmission of a radio wave signal, the radio wave transceiver 215 may perform transmission beamforming (Tx beamforming) for generating a radio wave signal to have a certain gain, a certain phase, and a certain frequency. Also, for reception of a radio wave signal, the radio wave transceiver 215 may perform reception beamforming (Rx beamforming) for receiving and processing a radio wave corresponding to a certain phase and a certain frequency. Beamforming may refer to an operation for radiating or receiving a beam having a particular form. Particularly, beamforming may refer to an operation of adjusting, when a plurality of antenna elements are arranged, the radiation direction of an overall beam by adjusting the phase of a signal applied to the arranged antenna elements. Here, "overall beam" may be referred to as "main beam".

In an embodiment, the radio wave transceiver 215 may generate a phase-adjusted radio wave signal according to the control by the processor 220. Particularly, the processor 220 may determine the phase of a radio wave signal and control the array antenna 210 including the radio wave transceiver 215 to transmit/receive a radio wave signal having the determined phase.

Hereinafter, a particular operation and control method of the vehicle electronic apparatus 160, 200, or 300 according to an embodiment will be described in detail with reference to FIGS. 4 to 9.

Figure 4:
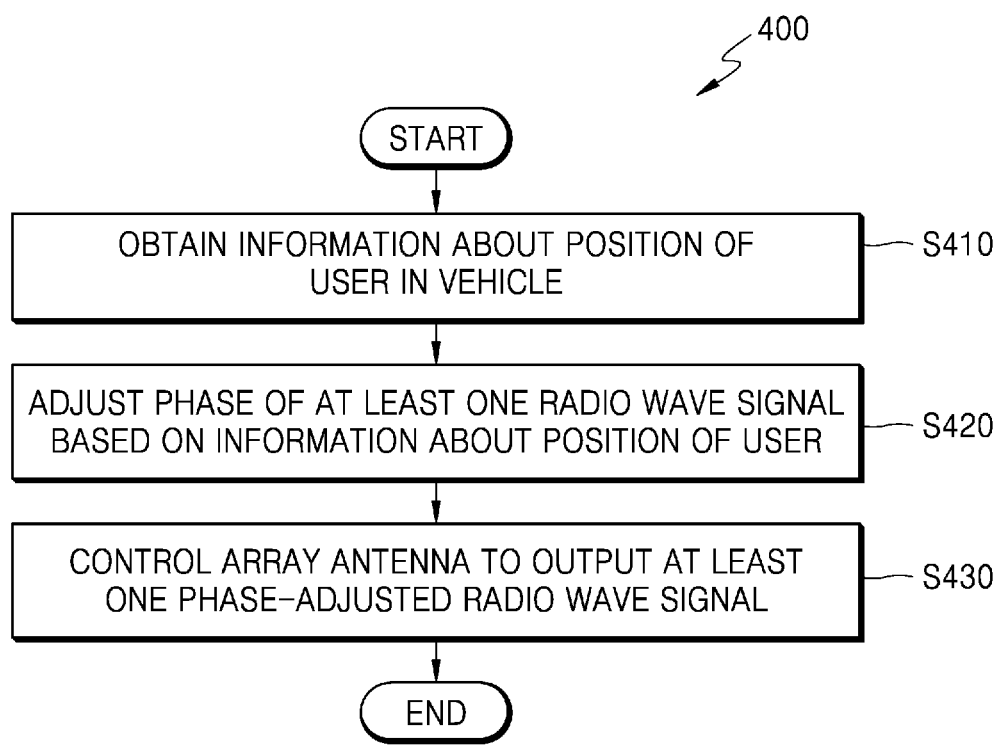
FIG. 4 is a flowchart illustrating a method of controlling an antenna apparatus, according to an embodiment of the disclosure.

FIG. 4 is a flowchart illustrating a method of controlling an antenna apparatus according to an embodiment of the disclosure.

Referring to FIG. 4 may be a flowchart illustrating the operations performed by the vehicle electronic apparatus 160, 200, or 300 according to an embodiment described above with reference to FIGS. 1 to 3 or the operations for controlling the vehicle electronic apparatus 160, 200, or 300. Particularly, a vehicle antenna apparatus control method 400 may be performed through the vehicle electronic apparatus 160, 200, or 300. Thus, in describing the vehicle antenna apparatus control method 400 illustrated in FIG. 4, redundant descriptions with those of the vehicle electronic apparatus 160, 200, or 300 described above with reference to FIGS. 1 to 3 will be omitted for conciseness.

Referring to FIG. 4, a case where the vehicle antenna apparatus control method 400 is performed in the vehicle electronic apparatus 300 illustrated in FIG. 3 will be described as an example.

Referring to FIG. 4, the vehicle antenna apparatus control method 400 may be a control method for the vehicle electronic apparatus 300 including an array antenna 210 including a plurality of antenna elements and installed in a vehicle.

The vehicle antenna apparatus control method 400 may obtain information about the position of the user based on the sensing result of the sensor 230 for sensing the position of the user riding in the vehicle in operation S410. Operation S410 may be performed by the processor 220 of the vehicle electronic apparatus 300.

Here, "information about the position of the user" may be information representing the position of the user riding in the vehicle in the three-dimensional space. Particularly, the information about the position of the user may be information representing the position of the user riding in the vehicle as a three-dimensional coordinate value in the three-dimensional space. For example, the information about the position of the user includes three-dimensional coordinate values of an area where the user is located with respect to a set coordinate system.

Also, when a plurality of users ride in the vehicle, the processor 220 may obtain position information representing each of the plurality of users.

Based on the information about the position of the user obtained in operation S410, the vehicle antenna apparatus control method 400 may adjust the phase of at least one radio wave signal such that the position of a radiation pattern formed by the at least one radio wave signal output from the plurality of antenna elements and the position of the user riding in the vehicle may vary from each other in operation S420. Operation S420 may be performed by the processor 220 of the vehicle electronic apparatus 300.

Particularly, based on the information about the position of the user obtained in operation S410, the processor 220 of the vehicle electronic apparatus 300 may calculate at least one phase value to be applied to at least one radio wave signal output from at least one of the plurality of antenna elements and control the radio wave transceiver 215 such that the calculated phase value may be applied to the corresponding radio wave signal in operation S420.

The radiation pattern may be a pattern formed by the radio wave signals respectively transmitted/received by the plurality of antenna elements included in the array antenna 210.

The direction of the radiation pattern and the shape of a spatial area formed by the radiation pattern may vary depending on at least one of the phase and gain (or power or signal amplitude) of the radio wave signals transmitted/received by the array antenna 210. Also, the "position of the radiation pattern" described above may be a spatial position of a pattern formed by the radio wave signals respectively transmitted/received by the plurality of antenna elements included in the array antenna 210. That is, the position of the radiation pattern may represent the three-dimensional position of the pattern represented by the radio wave signals propagated to a certain area in the three-dimensional space.

Because the processor 220 knows the phase and gain of the transmitted/received radio wave signals, it may know information about the position of the radiation pattern. The processor 220 may obtain information about the position of the radiation pattern corresponding to the phase and gain of the radio wave signals at the time when the phase adjustment is performed.

Particularly, the processor 220 may adjust the phase of at least one radio wave signal such that the radiation pattern and the user may not overlap each other. Particularly, the processor 220 may adjust the phase of at least one radio wave signal such that an area in the three-dimensional space corresponding to the radiation pattern and an area in the three-dimensional space where the user is located may not overlap each other.

That is, the processor 220 may adjust the phase of the radio wave signal radiated from the array antenna 210 such that a beam may be radiated into a space where the user of the processor 220 is not located.

Not overlapping each other may not mean that an area in the three-dimensional space corresponding to the radiation pattern is completely different from an area in the three-dimensional space where the user is located. Thus, the processor 220 may perform the phase adjustment such that the size of an area in which an area in the three-dimensional space corresponding to the radiation pattern formed by a radio wave signal having a certain signal size or more and an area in the three-dimensional space where the user is located overlap each other may be less than or equal to or may be less than a limit value.

Also, the electromagnetic wave absorption rate described above may be considered in determining whether the areas overlap each other.

The processor 220 may determine an electromagnetic wave absorption rate allowable for the user by considering the frequency, signal strength, and gain of the radio wave signal transmitted/received through the array antenna 210, the distance between the array antenna 210 and the user, and/or the like. The electromagnetic wave absorption rate allowable for the user may be determined according to the international recommendation standard (e.g., 2 W/kg or the like). Also, the processor 220 may previously store information about the electromagnetic wave absorption rate allowable for the user.

For example, when an electromagnetic wave absorption rate corresponding to an area where the radiation pattern and the user overlap each other is greater than a limit value, the processor 220 adjusts the phase of the at least one radio wave signal such that the electromagnetic wave absorption rate corresponding to the area may be less than or equal to the limit value. The area may refer to a user's body area exposed to the electromagnetic wave by the radiation pattern. Because the electromagnetic wave absorption rate refer to the amount of electromagnetic wave energy absorbed by the unit mass (e.g., kg or g) of the human body, the electromagnetic wave absorption rate may vary according to the mass of the human body corresponding to the area. Therefore, even when the human body is exposed to the electromagnetic wave in an area where the radiation pattern and the user overlap each other, when the limit value of the electromagnetic wave absorption rate corresponding to the mass of the human body in area is not exceeded, the processor 220 may not perform the phase adjustment by determining that the radiation pattern and the user do not overlap each other.

Also, for example, the processor 220 identifies a limit size of the area based on the allowable electromagnetic wave absorption rate. By considering the limit size of the area, when the area occurs in excess of the limit size, it may be determined that the radiation pattern and the user overlap each other.

The processor 220 may experimentally optimize and previously store the limit value and the limit size described above. Also, the processor 220 may previously store the allowable electromagnetic wave absorption rate in accordance with the international recommendation standard for the electromagnetic wave absorption rate or the notice of the National Radio Research Agency (particularly, the National Radio Research Agency Notice No. 2015-23 (electromagnetic wave absorption rate measurement standard)). The processor 220 may determine whether the areas overlap each other, based on at least one of information about the limit value, the limit size, and the allowable electromagnetic wave absorption rate described above.

Also, based on the information about the position of the user obtained in operation S410, as a result of determining whether the position of the radiation pattern and the position of the user overlap each other, when it is determined that the position of the radiation pattern and the position of the user do not overlap each other, the processor 220 may maintain the phase of at least one radio wave signal at a previous set value.

Particularly, based on the information about the position of the user obtained in operation S410, as a result of determining whether the position of the radiation pattern and the position of the user overlap each other, the processor 220 may determine that the position of the radiation pattern and the position of the user do not overlap each other. Then, the processor 220 may not perform the phase adjustment of operation S420. That is, radio wave signals having previously-set phase values may be output through a plurality of antenna elements included in the array antenna 210. Accordingly, the radiation pattern formed by a plurality of radio wave signals output from a plurality of antenna elements may not be changed.

Subsequently, the vehicle antenna apparatus control method 400 may control the array antenna 210 to output at least one radio wave signal with the phase adjusted in operation S420 in operation S430. Operation S430 may be performed by the processor 220 of the vehicle electronic apparatus 300. Particularly, the processor 220 of the vehicle electronic apparatus 300 may calculate at least one phase value to be applied to each of at least one radio wave signal and control the radio wave transceiver 215 such that the calculated phase value may be applied to the corresponding radio wave signal.

Also, based on the information about the position of the user obtained in operation S410, when it is determined that the position of the radiation pattern and the position of the user overlap each other, the processor 220 may provide a vehicle (not shown) with a message informing that the position of the radiation pattern and the position of the user overlap each other. Particularly, when the processor 220 transmits data representing the degree of overlap between the position of the radiation pattern and the position of the user to the vehicle (not shown), an image representing the degree of overlap between the position of the radiation pattern and the position of the user may be output through a display (not shown) included in the vehicle (not shown). In this case, the user will be able to perform an operation such as changing his/her seating position while viewing the output image.

The operation of operations S420 and S430 described above will be described below in detail with reference to FIGS. 5 to 7.

Figure 5:
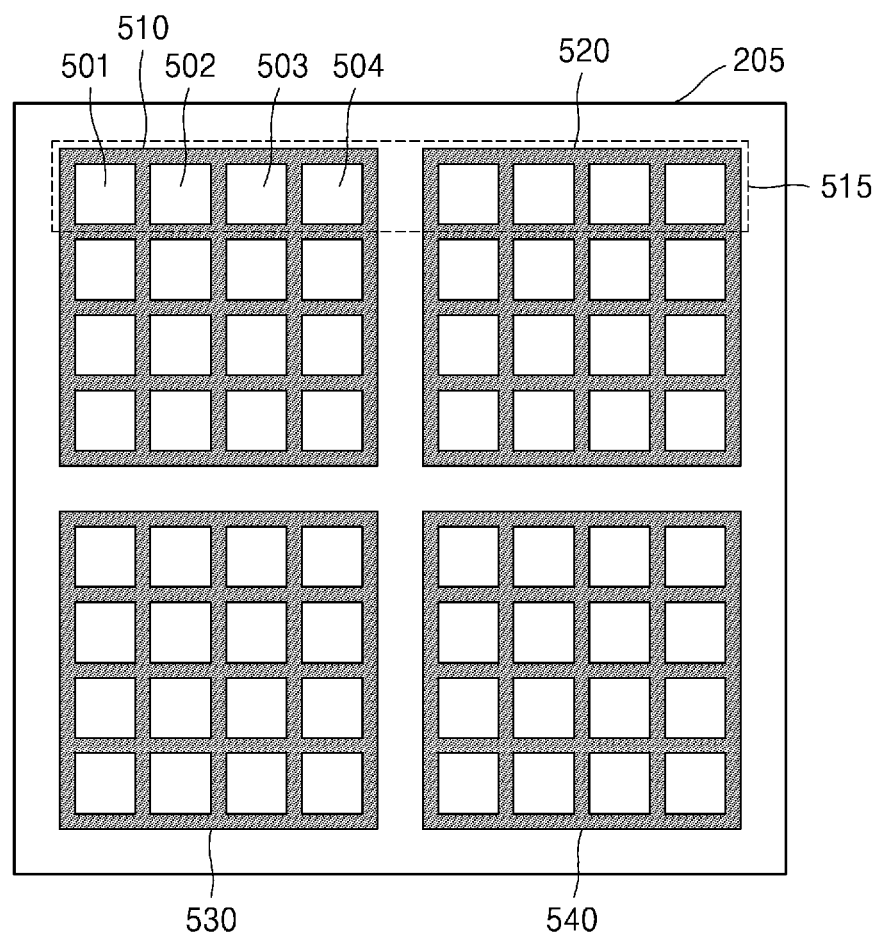
FIG. 5 is a diagram illustrating an array antenna included in an antenna apparatus, according to an embodiment of the disclosure.

FIG. 5 is a diagram illustrating an array antenna included in an antenna apparatus according to an embodiment of the disclosure.

Referring to FIG. 5, an example of an array 205 that is a set of a plurality of antenna elements included in an array antenna 510 is illustrated.

Referring to FIG. 5, in an embodiment, the array 205 may include at least one set of n*n antenna elements. For example, the array 205 includes four sets (e.g., the array antenna 510) 510, 520, 530, and 540 of 4*4=16 antenna elements (i.e., the antenna elements 501 and 502). In this case, the array 205 may be represented as a set of 8*8=64 antenna elements. Particularly, 8 antenna elements may be arranged in the transverse direction and 8 antenna elements may be arranged in the longitudinal direction to form a group of a total of 64 antenna elements.

A phase value of each of a plurality of antenna elements included in the array 205 may be separately set. Also, at least one phase value respectively applied to at least one of the plurality of antenna elements included in the array 205 may be set as different values.

Figure 6:
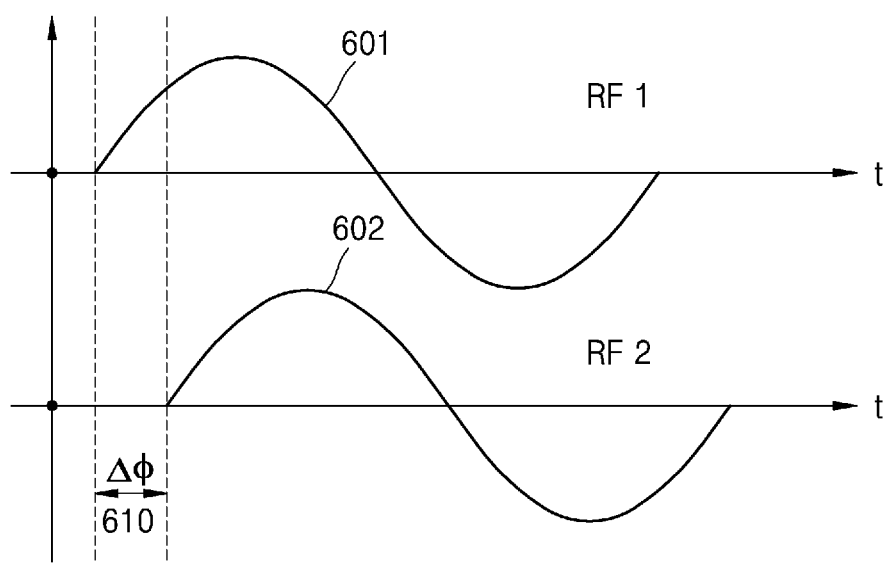
FIG. 6 is a diagram for describing a phase adjustment operation performed by an antenna apparatus, according to an embodiment of the disclosure.

FIG. 6 is a diagram for describing a phase adjustment operation performed by an antenna apparatus according to an embodiment of the disclosure.

Referring to FIG. 6, it is a diagram for describing a phase or delay value applied to each of the plurality of antenna elements included in the array 205 illustrated in FIG. 5.

The processor 220 may perform control to generate a plurality of radio wave signals respectively corresponding to a plurality of antenna elements included in the array 205. Also, the processor 220 may separately control the phase values of a plurality of radio wave signals respectively corresponding to a plurality of antenna elements. In FIG. 6, for convenience of description, only the antenna element 501 illustrated in FIG. 5 and radio wave signals 601 and 602 applied to the antenna element 501 are illustrated as an example.

In FIG. 6, the x axis of a graph representing the radio wave signal (e.g., 601) may represent time, and the y axis thereof may represent the magnitude or gain of the signal.

Referring to FIG. 6, the processor 220 may adjust the phase of the radio wave signal 601 applied to the antenna element 501 and the phase of the radio wave signal 602 applied to the antenna element 502 arranged adjacent to the antenna element 501 such that they may be different from each other. Particularly, the phase value of the radio wave signal 602 may be set by giving a set phase delay 610 to the phase of the radio wave signal 601.

Also, the processor 220 may control the array antenna 210 such that each of a plurality of radio wave signals applied to a plurality of antenna elements (i.e., the antenna elements 501 and 502) arranged in the same direction may have a phase value different from each other by the set phase delay 610. For example, the processor 220 sets the phase values such that the phase of the radio wave signal 601 applied to the antenna element 501 and the phase of the radio wave signal 602 applied to the antenna element 502 has a difference of the set phase delay 610 therebetween. Also, the processor 220 may set the phase values such that the phase of the radio wave signal 602 applied to the antenna element 502 and the phase of a radio wave signal (not shown) applied to an antenna element 503 may have a difference of the set phase delay 610 therebetween. Also, the processor 220 may set the phase values such that the phase of the radio wave signal applied to the antenna element 503 and the phase of a radio wave signal (not shown) applied to an antenna element 504 may have a difference of the set phase delay 610 therebetween.

As another example, the processor 220 controls the array antenna 210 such that each of a plurality of radio wave signals applied to a plurality of antenna elements (i.e., the antenna elements 501 and 502) arranged in the same direction may have a phase value different from each other by a separately set phase delay (i.e., the phase delay 610). That is, the phase differences between the plurality of radio wave signals applied to the plurality of antenna elements (e.g., the antenna elements 501 and 502) arranged in the same direction may have different values.

As described above, the plurality of radio wave signals applied to the plurality of antenna elements (i.e., the antenna elements 501 and 502) may have a predetermined phase delay (i.e., phase delay 610). Each of the plurality of radio wave signals may be a radio frequency (RF) carrier signal. That is, a "phase coherent signal" having a stable phase relationship between a plurality of RF carrier signals may be generated by setting a uniform phase delay between the plurality of RF carrier signals. As described above, when a uniform phase difference is given between a plurality of RF carrier signals, the direction of an overall beam output from a plurality of antenna elements may be adjusted to a desired direction. As such, adjusting the direction of the overall beam to a desired direction may be referred to as "beam steering". A beam steering operation will be described below in detail with reference to FIG. 7.

Figure 7:
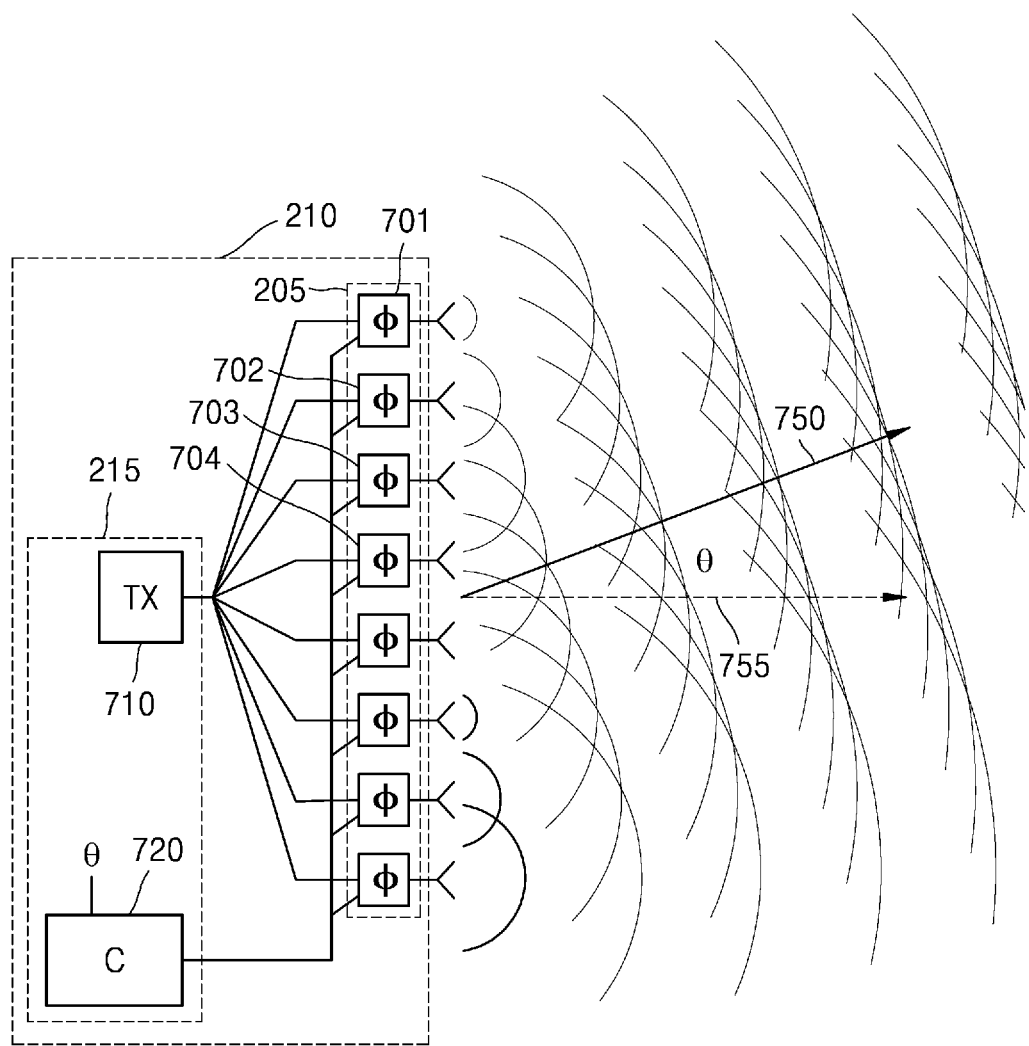
FIG. 7 is another diagram for describing a phase adjustment operation performed by an antenna apparatus, according to an embodiment of the disclosure.

FIG. 7 is another diagram for describing a phase adjustment operation performed by an antenna apparatus according to an embodiment of the disclosure.

Referring to FIG. 7, it is a diagram illustrating a plurality of radio wave signals respectively output to a plurality of antenna elements included in the array 205 of the array antenna 210 and the radiation direction of a main beam formed by the plurality of radio wave signals.

In FIG. 7, only the configuration necessary to output a beam in the array antenna 210 is illustrated. Also, in FIG. 7, the same components as those illustrated in FIGS. 2 and 5 are denoted by the same reference symbols.

Also, in FIG. 7, among the plurality of antenna elements included in the array 205, only the antenna elements arranged in the same array are illustrated as an example. Particularly, 8 antenna elements included in the array 205 illustrated in FIG. 7 may correspond to 8 antenna elements included in one row 515 illustrated in FIG. 5.

In an embodiment, based on the information about the position of the user obtained in operation S410, the processor 220 may control such that the radio wave radiation direction of the array antenna 210 may be changed by adjusting the phase of each of the plurality of radio wave signals to be respectively output from the plurality of antenna elements included in the array antenna 210. The radio wave radiation direction may refer to the radiation direction of the main beam described above.

The radio wave transceiver 215 may include a phase controller 720 and a transmission beamformer 710. The transmission beamformer 710 may generate radio wave signals to be respectively applied to a plurality of antenna elements. Particularly, the transmission beamformer 710 may generate a radio wave signal to have a certain gain and a certain frequency. The phase controller 720 may perform control such that the phase of the radio wave signals to be respectively applied to the plurality of antenna elements included in the array 205 may have a predetermined value. The radio wave signals generated by the transmission beamformer 710 may be respectively applied to a plurality of antenna elements 701, 702, 703, and 704, and the phase of each of the plurality of antenna elements 701, 702, 703, and 704 may be adjusted by the phase controller 720. Accordingly, a radio wave signal having a uniform phase difference between the phases of the plurality of antenna elements 701, 702, 703, and 704 may be output.

When all of the phases of the plurality of antenna elements 701, 702, 703, and 704 are equal to each other, the radiation direction of the main beam may be a straight direction 755 as illustrated. Also, when the phase of each of the plurality of antenna elements 701, 702, 703, 704 has a phase difference by a uniform phase delay 610 as described above with reference to FIG. 6, the radiation direction of the main beam may be a direction 750 bent by a predetermined angle from the straight direction 755 as illustrated. The bent degree of the direction 750 may vary according to the value of the phase delay 610. That is, when it is desired to increase the bent degree of the radiation direction of the main beam, the value of the phase delay 610 may be increased.

As described above, shifting the phase of the radio wave signal to radiate a beam corresponding to the radio wave signal may be referred to as "beamforming phase shift". In an embodiment, by performing a beamforming phase shift on the radio wave signals output from the array antenna 210, radio wave radiation into the space where the user riding in the vehicle is located may be minimized. Accordingly, the problem of an electromagnetic wave absorption rate due to the radio wave exposed to the user riding in the vehicle may be overcome.

Particularly, in another embodiment, based on the information about the position of the user, the radiation direction of the main beam may be adjusted such that the radiation pattern and the user may not overlap each other. That is, the processor 220 may perform control such that the radiation direction of the main beam output from the array 205 may be directed to the space where the user is not located. Accordingly, according to another embodiment, the electromagnetic wave absorption rate on the user of the vehicle may be minimized.

Also, when a plurality of users are located in the vehicle, the processor 220 may obtain information about the position of each of the plurality of users and perform control such that the radiation direction of the output main beam may be directed to the space where the plurality of users are not located.

Figure 8:
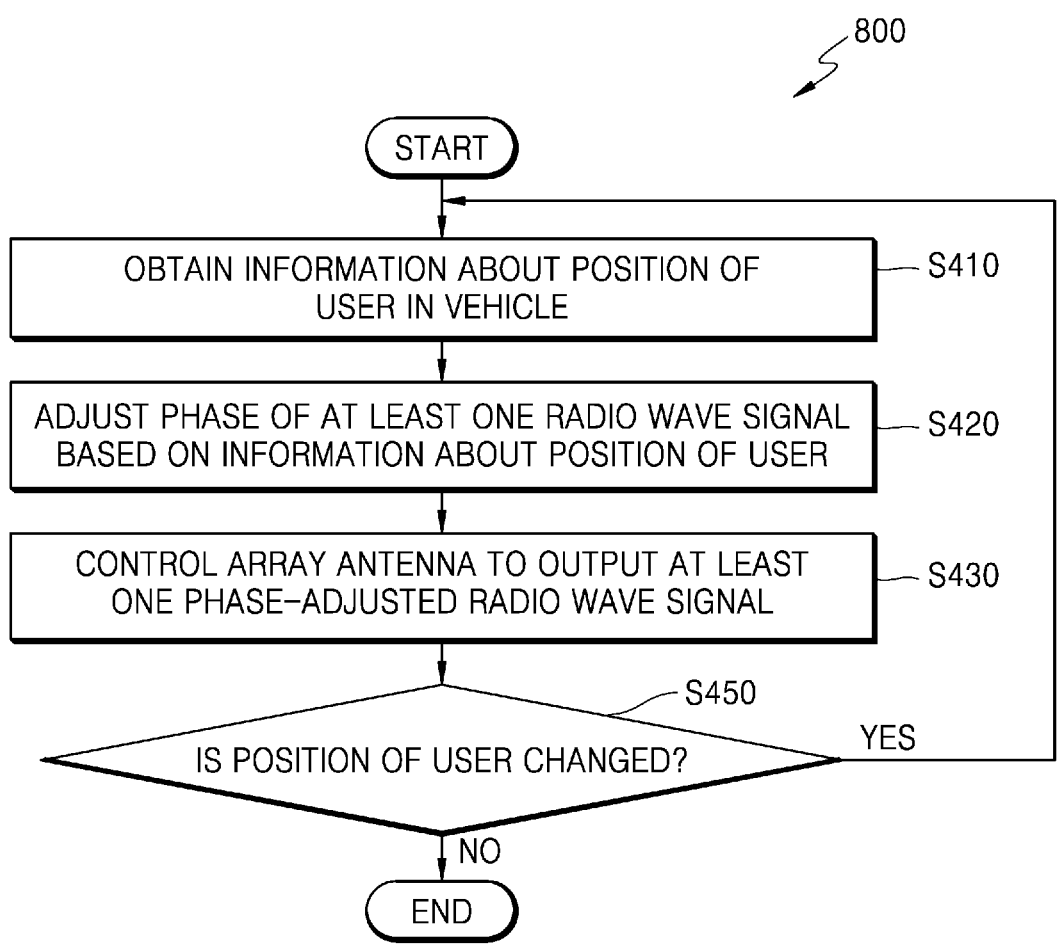
FIG. 8 is another flowchart illustrating a method of controlling an antenna apparatus, according to an embodiment of the disclosure.

FIG. 8 is another flowchart illustrating a method of controlling an antenna apparatus according to an embodiment of the disclosure. In the operations illustrated in FIG. 8, the same operations as those in FIG. 4 are denoted by the same reference symbols. Thus, in describing a vehicle antenna apparatus control method 800 illustrated in FIG. 8, redundant descriptions with those of the vehicle antenna apparatus control method 400 described above with reference to FIG. 4 will be omitted for conciseness.

Compared to the vehicle antenna apparatus control method 400, the vehicle antenna apparatus control method 800 may further include operation S450.

Referring to FIG. 8, the vehicle antenna apparatus control method 800 may obtain information about the position of the user based on the sensing result of the sensor 230 for sensing the position of the user riding in the vehicle in operation S410. Operation S410 may be performed by the processor 220 of the vehicle electronic apparatus 300.

Based on the information about the position of the user obtained in operation S410, the vehicle antenna apparatus control method 800 may adjust the phase of at least one radio wave signal such that the position of a radiation pattern formed by the at least one radio wave signal output from the plurality of antenna elements and the position of the user riding in the vehicle may vary from each other in operation S420. Operation S420 may be performed by the processor 220 of the vehicle electronic apparatus 300.

Subsequently, the vehicle antenna apparatus control method 800 may control the array antenna 210 to output at least one radio wave signal with the phase adjusted in operation S420 in operation S430. Operation S430 may be performed by the processor 220 of the vehicle electronic apparatus 300.

Subsequent to operation S430, based on the sensing result of the sensor 230, the vehicle antenna apparatus control method 800 may determine whether the position of the user is changed in operation S450. As a result of the determination in operation S450, when it is determined that the position of the user is changed, the phase of at least one radio wave signal may be readjusted such that the position of the radiation pattern and the changed position of the user may not overlap each other. That is, as a result of the determination in operation S450, when it is determined that the position of the user is changed, the vehicle antenna apparatus control method 800 may return to operation S410 and re-perform the operations of operations S410, S420, and S430. That is, whenever the position of the user is changed, the vehicle antenna apparatus control method 800 may repeatedly perform the operations of operations S410, S420, and S430.

Particularly, the vehicle antenna apparatus control method 800 may track and monitor the position of the user in real time. Alternatively, the vehicle antenna apparatus control method 800 may monitor the position of the user at predetermined time intervals. Accordingly, when a change in the position of the user is sensed and thus it is determined that the radiation pattern and the user overlap each other, the operations of operations S410, S420, and S430 may be re-performed.

Also, operation S450 may further include an operation (not shown) of determining whether the position of the user is changed by a threshold value or more and an operation (not shown) of readjusting, when it is determined that the position of the user is changed by the threshold value or more, the phase of the at least one radio wave signal such that the position of the radiation pattern and the changed position of the user may vary from each other. Particularly, as a result of continuously monitoring the position of the user, only when it is determined that the position of the user is changed by a threshold value or more and thus a significant overlap has occurred between the position of the user and the radiation pattern, the processor 220 may perform phase readjustment. For example, when a change has occurred in the position of the user but there is no change in the electromagnetic wave absorption rate on the user due to the change in the position, the processor 220 does not perform phase adjustment according to the change in the position of the user.

Figure 9:
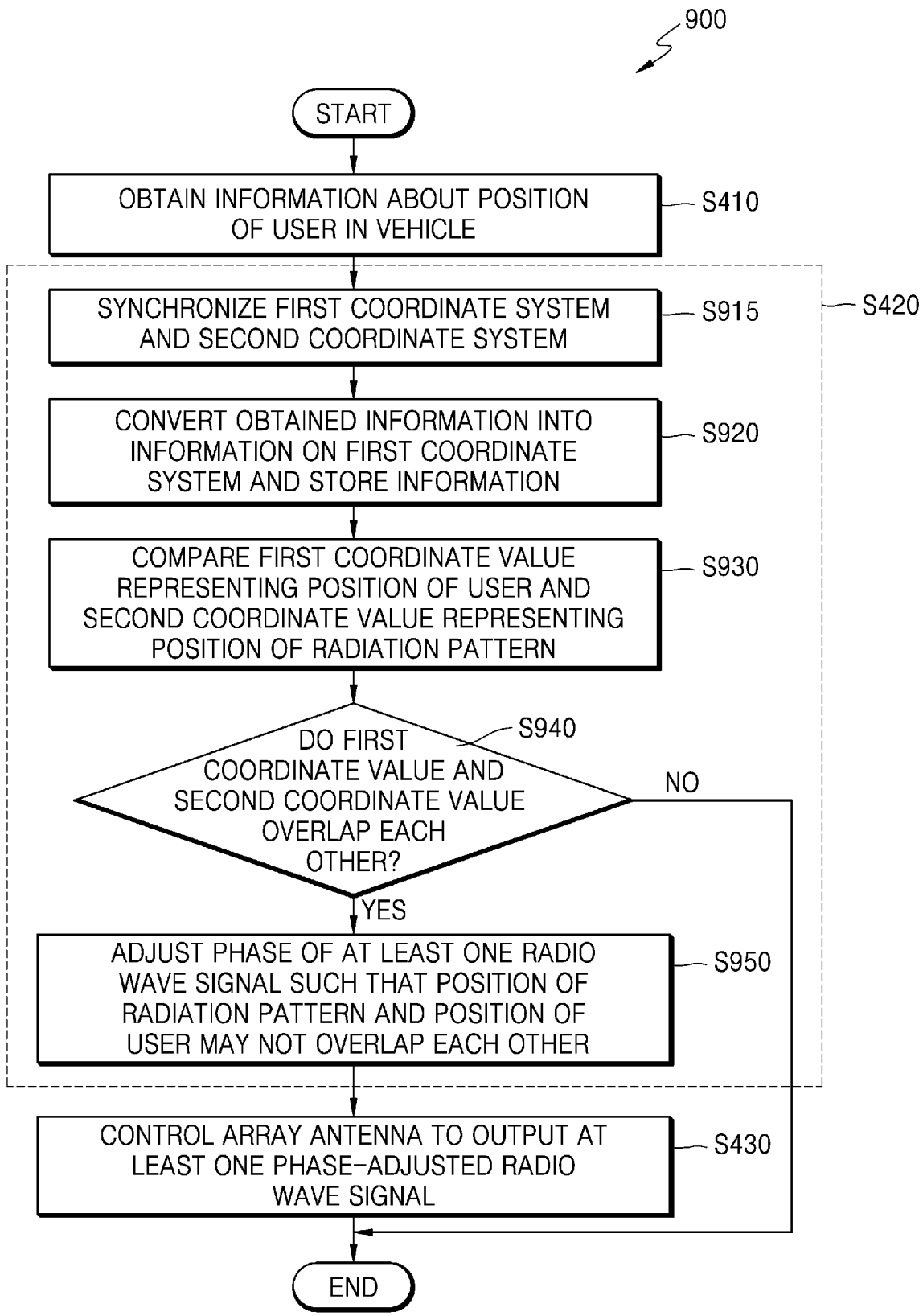
FIG. 9 is another flowchart illustrating a method of controlling an antenna apparatus, according to an embodiment of the disclosure.

FIG. 9 is another flowchart illustrating a method of controlling an antenna apparatus according to an embodiment of the disclosure. In the operations illustrated in FIG. 9, the same operations as those in FIG. 4 are denoted by the same reference symbols. Thus, in describing a vehicle antenna apparatus control method 900 illustrated in FIG. 9, redundant descriptions with those of the vehicle antenna apparatus control method 400 described above with reference to FIG. 4 will be omitted for conciseness.

Referring to FIG. 9, the vehicle antenna apparatus control method 900 may obtain information about the position of the user based on the sensing result of the sensor 230 for sensing the position of the user riding in the vehicle in operation S410. Operation S410 may be performed by the processor 220 of the vehicle electronic apparatus 300.

Based on the information about the position of the user obtained in operation S410, the vehicle antenna apparatus control method 900 may adjust the phase of at least one radio wave signal such that the position of a radiation pattern formed by the at least one radio wave signal output from the plurality of antenna elements and the position of the user riding in the vehicle may vary from each other in operation S420. Operation S420 may be performed by the processor 220 of the vehicle electronic apparatus 300.

Particularly, operation S420 may include operations S915, S920, S930, S940, and S950. The operations of operations S915, S920, S930, S940, and S950 will be described below in detail.

In an embodiment, in order to determine whether the position of the user and the radiation pattern overlap each other, the processor 220 may synchronize a coordinate system representing the position of the user and a coordinate system representing the radiation pattern and use the synchronized coordinate system to determine whether the position of the user and the radiation pattern overlap each other.

Particularly, the vehicle antenna apparatus control method 900 may synchronize a first coordinate system that is a three-dimensional coordinate system for representing the position of the user and a second coordinate system that is a three-dimensional coordinate system for representing the position of the at least one radio wave signal in operation S915.

Here, the first coordinate system may be a three-dimensional coordinate system for three-dimensionally representing the position of the user sensed by the sensor 230. Particularly, the space where the user is located in the vehicle may be a three-dimensional space, and the sensor 230 may obtain information for three-dimensionally representing the position of the user in the vehicle. For example, when the sensor 230 is a ToF sensor, the ToF sensor may obtain depth information about the space where the user is located. Then, based on the depth information about the user obtained by the ToF sensor, the processor 220 may obtain information about the space where the user is located, as coordinate values on the first coordinate system.

The second coordinate system may be a three-dimensional coordinate system for representing the position of at least one radio wave signal among a plurality of radio wave signals output from a plurality of antenna elements included in the array antenna 210. For example, the origin of the second coordinate system corresponds to the output start point of radio wave signals output from a plurality of antenna elements included in the array antenna 210. In this case, the radio wave signals may be represented as being radiated from the origin of the second coordinate system onto the space of the second coordinate system.

Also, the "synchronization" described above may refer to an operation of adjusting the first coordinate system and the second coordinate system to correspond to each other. That is, the "synchronization" may refer to an operation of adjusting at least one of the first coordinate system and the second coordinate system such that the first coordinate system and the second coordinate system may become coordinate systems having the same standard.

Particularly, the vehicle antenna apparatus control method 900 may move the second coordinate system with respect to the first coordinate system such that the second coordinate system may match the first coordinate system. Alternatively, the first coordinate system may be moved with respect to the second coordinate system such that the first coordinate system may match the second coordinate system. Alternatively, a reference coordinate system used to synchronize the first coordinate system and the second coordinate system may be set, and each of the first coordinate system and the second coordinate system may be moved such that each of the first coordinate system and the second coordinate system may match the reference coordinate system.

The vehicle antenna apparatus control method 900 may convert the information about the position of the user obtained in operation S410 into information on the synchronized first coordinate system and store the information in operation S920. Operation S920 may be performed by the processor 220 of the vehicle electronic apparatus 300. Particularly, the sensor 230 may obtain information necessary to three-dimensionally sense the position of the user. Then, based on the information obtained from the sensor 230 (e.g., the sensing result of the sensor), the processor 220 may obtain three-dimensional coordinate values about the space where the user is located on the synchronized first coordinate system. For example, the processor 220 converts information about the position of the user, which is the information obtained from the sensor 230 (e.g., the sensing result of the sensor), into a plurality of coordinate values on the synchronized first coordinate system.

Particularly, the information about the position of the user may be converted into a value on the first coordinate system and stored in a register. The register may be included in a memory area included in the processor 220. Alternatively, the register may be included in a memory (not shown) included in the vehicle electronic apparatus 200 or 300. Alternatively, the register may be included in a memory (not shown) in the vehicle capable of communicating with the vehicle electronic apparatus 200 or 300. Also, like the first coordinate value, a second coordinate value that is position information about the radiation pattern may also be stored in the register.

By using the first coordinate system and the second coordinate system synchronized in operation S915, the vehicle antenna apparatus control method 900 may compare the first coordinate value corresponding to the position of the user and the second coordinate value corresponding to the radiation pattern in operation S930. Operation S420 may be performed by the processor 220 of the vehicle electronic apparatus 300. In operation S930, the "first coordinate value" may not represent a three-dimensional coordinate value of a certain point but may represent a set of three-dimensional coordinate values representing the space where the user is located. The "second coordinate value" may not represent a three-dimensional coordinate value of a certain point but may represent a set of three-dimensional coordinate values representing the space formed by the radiation pattern.

In operation S930, because the first coordinate system and the second coordinate system are synchronized in operation S915, the first coordinate value and the second coordinate value may be values represented in the same coordinate system. Thus, the first coordinate value and the second coordinate value may be easily compared.

Based on the comparison result of operation S930, it may be determined whether the first coordinate value and the second coordinate value overlap each other in operation S940. Particularly, based on the comparison result in operation S930, the processor 220 may determine whether there is an overlapping area between the space represented by the first coordinate value and the space represented by the second coordinate value. Because whether there is an overlapping area has been described above in detail in the description of operation S420 of FIG. 4, redundant descriptions thereof will be omitted for conciseness.

As a result of the determination in operation S940, when it is determined that there is an overlap therebetween, the phase of at least one radio wave signal may be adjusted such that the position of the radiation pattern and the position of the user may not overlap each other in operation S950.

Subsequently, the vehicle antenna apparatus control method 900 may control the array antenna 210 to output at least one radio wave signal with the phase adjusted in operation S420 in operation S430. Operation S430 may be performed by the processor 220 of the vehicle electronic apparatus 300.

The vehicle antenna apparatus control method 400, 800, or 900 according to an embodiment may be designed with at least one instruction for executing the same.

Particularly, another embodiment may be a non-transitory computer-readable storage medium having stored therein a program including at least one instruction to perform the vehicle antenna apparatus control method 400, 800, or 900.

For example, another embodiment is a non-transitory computer-readable storage medium having stored therein a program including at least one instruction to perform a vehicle antenna apparatus control method, wherein the vehicle antenna apparatus control method is a method of controlling a vehicle antenna apparatus including an array antenna including a plurality of antenna elements and installed in a vehicle, wherein the method includes an operation in operation S410 of obtaining, based on a sensing result of a sensor for sensing a position of a user riding in the vehicle, information about the position of the user, an operation in operation S420 of adjusting, based on the information about the position of the user, a phase of at least one radio wave signal such that a position of a radiation pattern formed by the at least one radio wave signal output from the plurality of antenna elements and the position of the user riding in the vehicle vary from each other, and an operation in operation S430 of controlling the array antenna to output the at least one phase-adjusted radio wave signal.

As described above, the vehicle antenna apparatus and the control method thereof according to embodiments may minimize the influence of the electromagnetic wave on the user by adjusting the phase of the radiation pattern such that the radiation pattern and the user may not overlap each other.

Also, by implementing a vehicle antenna apparatus including an array antenna installed in a vehicle and including a plurality of antenna elements, instead of mounting a vehicle antenna apparatus in the same configuration as the shark-fin module or the glass of the vehicle, the vehicle antenna apparatus and the control method thereof according to embodiments may reduce the risk of damage due to external impact and minimize the absorption of the electromagnetic wave on the user in relation to the electromagnetic wave that may be generated when the array antenna is mounted in the vehicle.

Figure 10:
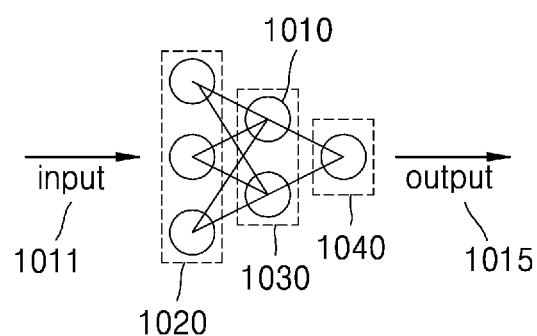
FIG. 10 is a diagram for describing an operation performed in an embodiment by using artificial intelligence technology according to an embodiment of the disclosure.

FIG. 10 is a diagram for describing an operation performed in an embodiment by using artificial intelligence technology according to an embodiment of the disclosure.

Particularly, at least one of i) an operation of adjusting the phase of at least one radio wave signal and ii) an operation of controlling the array antenna such that at least one phase-adjusted radio wave signal may be output, which are performed by the processor 220, may be performed by using an artificial intelligence (AI) technology that performs an operation through a neural network. Particularly, "i) the above operation of adjusting the phase of at least one radio wave signal" may be "an operation of adjusting, based on the information about the position of the user, the phase of the at least one radio wave signal such that the position of the radiation pattern formed by the at least one radio wave signal output from the plurality of antenna elements and the position of the user riding in the vehicle may vary from each other".

Artificial intelligence technology (hereinafter referred to as "AI technology") may be a technology for obtaining a desired result by processing (e.g., analyzing and/or classifying) input data by performing an operation through a neural network.

The AI technology may be implemented by using an algorithm. An algorithm or a set of algorithms for implementing the AI technology may be referred to as a neural network. The neural network may receive input data, perform an operation for analysis and/or classification, and output result data. As such, in order for the neural network to accurately output the result data corresponding to the input data, it may be necessary to train the neural network. Here, "training" may represent training the neural network such that the neural network may find and learn by itself a method of inputting various data into the neural network and analyzing the input data, a method of classifying the input data, and/or a method of extracting features necessary for generating result data from the input data. Particularly, through a training process, the neural network may optimize and set the weight values in the neural network based on training data (e.g., a plurality of different images). A desired result may be output by self-learning the input data through the neural network having the optimized weight values.

Particularly, the neural network may be classified as a deep neural network when the neural network includes a plurality of hidden layers as internal layers for performing an operation, that is, when the depth of the neural network for performing an operation increases. Examples of the neural network may include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), and Deep Q-Networks. Also, the neural network may be subdivided. For example, the CNN neural network is subdivided into Deep Convolution Neural Networks (DCNNs) or CapsNet neural networks (not shown).

In an embodiment, an "AI model" may refer to a neural network including at least one layer that receives input data and operates to output a desired result. Also, the "AI model" may refer to an algorithm or a set of algorithms for outputting a desired result by performing an operation through a neural network, a processor for executing the algorithm (or the set of algorithms), software for executing the algorithm (or the set of algorithms), or hardware for executing the algorithm (or the set of algorithms).

Referring to FIG. 10, a neural network 1010 may be trained by receiving an input of training data. The trained neural network 1010 may perform an operation of receiving input data 1011 through an input terminal 1020, analyzing the input data 1011, and outputting output data 1015 as a desired result through an output terminal 1040. An operation through a neural network may be performed through a hidden layer 1030. In FIG. 10, for convenience, the hidden layer 1030 is illustrated as being formed as a single layer; however, the hidden layer 1030 may be formed as a plurality of layers.

Particularly, in another embodiment, based on the position information of the user, the neural network 1010 may learn the phase values of at least one radio wave signal output from a plurality of antenna elements (e.g., a plurality of antenna elements included in the array antenna 210) such that the position of the user and radiation pattern may not overlap each other. For example, the neural network 1010 analyzes the position of the user and the phase values of at least one radio wave signal output from a plurality of antenna elements included in the array antenna 210, to learn the phase values of the radio wave signals such that the position of the user and the radiation pattern may not overlap each other.

The trained neural network 1010 may receive the position information of the user and the arrangement information of the array antenna 210 and calculate the phase values of at least one radio wave signal output from a plurality of antenna elements included in the array antenna 210 such that the position of the user and the radiation pattern may not overlap each other. The calculated phase values may be output as phase information.

Referring to FIG. 10, in another embodiment, based on information about the position of the user, the neural network 1010 may perform an operation of outputting information about the phase of at least one radio wave signal such that the position of the radiation pattern formed by the at least one radio wave signal output from a plurality of antenna elements (e.g., a plurality of antenna elements included in the array antenna 210) and the position of the user riding in the vehicle may vary from each other.

Particularly, the neural network 1010 may receive position information about the user and arrangement information of the array antenna (e.g., 210 in FIG. 2) through the input terminal 1020 and output information about the phase of the at least one radio wave signal through the output terminal 1040 such that the position of the radiation pattern formed by at least one radio wave signal output from a plurality of antenna elements (e.g., a plurality of antenna elements included in the array antenna 210) and the position of the user riding in the vehicle may vary from each other. The arrangement information of the array antenna 210 may include at least one of the information about the position at which the array antenna 210 is installed in the vehicle and the position and arrangement information of a plurality of antenna elements included in the array antenna 210.

In another embodiment, the above neural network outputting information about the phase of at least one radio wave signal may be implemented in a processor (e.g., 220 of FIG. 2).

Alternatively, the above neural network outputting information about the phase of at least one radio wave signal may be distinguished from a vehicle antenna apparatus (e.g., 160 in FIG. 1) and may be implemented in a separate electronic apparatus (not shown) or a processor (not shown) located in a vehicle (e.g., 150 in FIG. 1).

Also, the operation through the neural network described above may be performed by a server (not shown) that may communicate with an antenna apparatus (e.g., 200) according to another embodiment through a wireless communication network. The communication between the vehicle electronic apparatus 200 and the server (not shown) will be described below in detail with reference to FIGS. 11 and 12.

Figure 11:
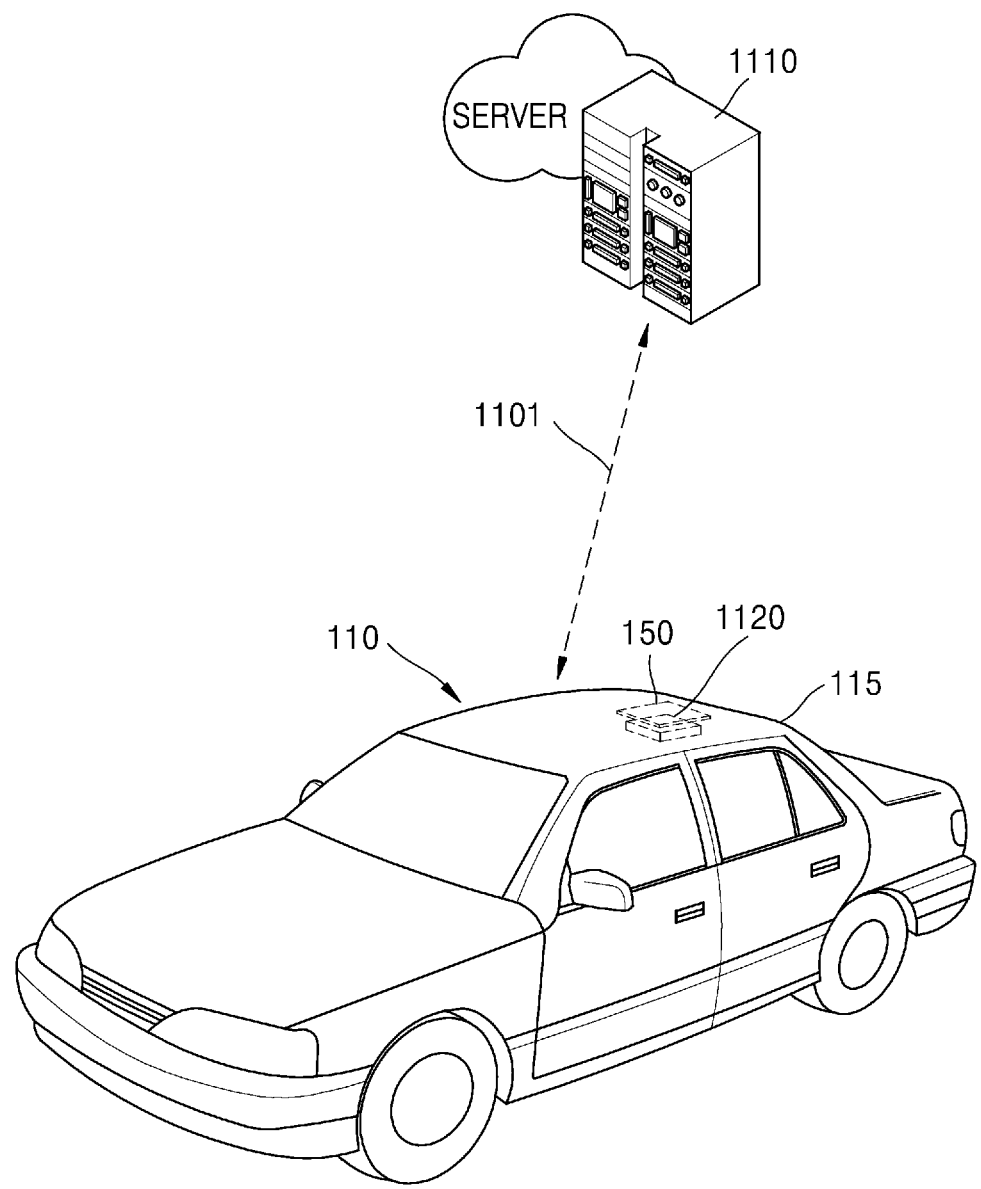
FIG. 11 is a diagram illustrating an antenna apparatus operating in conjunction with a server, according to an embodiment of the disclosure.

FIG. 11 is a diagram illustrating an electronic apparatus operating in conjunction with a server according to an embodiment of the disclosure.

Referring to FIG. 11, the same components as those in FIG. 1 are denoted by the same reference symbols.

Hereinafter, for convenience of description, information representing the phase value of at least one radio wave signal causing the position of the radiation pattern of the array antenna and the position of the user riding in the vehicle to vary from each other will be referred to as "phase information".

In an embodiment, phase information representing phase values applied to at least one radio wave signal output from an array antenna (e.g., 210 in FIG. 2) may be calculated by a server 1110 and then transmitted to a vehicle electronic apparatus 1120 located in the vehicle 110. Also, the server 1110 may include a server, a server system, a server-based apparatus, or the like that transmits/receives data to/from an electronic apparatus, for example, the vehicle electronic apparatus 1120, through a communication network and processes data.

Particularly, the vehicle electronic apparatus 1120 may be an electronic apparatus located in the vehicle 110 and may be a vehicle antenna apparatus (e.g., 160, 200, or 300) according to another embodiment.

Alternatively, the vehicle electronic apparatus 1120 may be a separate electronic apparatus that is located in the vehicle 110 and may perform wired/wireless communication with the vehicle antenna apparatus (e.g., 160, 200, or 300). When the vehicle electronic apparatus 1120 is distinguished from the vehicle antenna apparatus (e.g., 160, 200, or 300), the vehicle electronic apparatus 1120 may obtain the phase information and transmit the same to the vehicle antenna apparatus (e.g., 160, 200, or 300). Then, based on the phase information received from the vehicle electronic apparatus 1120, the vehicle antenna apparatus (e.g., 160, 200, or 300) may adjust the phase values of at least one radio wave signal output from a plurality of antenna elements included in the array antenna (e.g., 210 in FIG. 2).

In another embodiment, the server 1110 may include a communicator 1130 communicating with a vehicle antenna apparatus installed in a vehicle, and a processor 1150 executing at least one instruction.

The processor 1150 of the server 1110 may receive information about the position of the user corresponding to the sensing result of a sensor for sensing the position of the user riding in the vehicle, obtain, based on the information about the position of the user, phase information including the phase values of at least one radio wave such that the position of the radiation pattern formed by the at least one radio wave signal output from a plurality of antenna elements included in the array antenna of the vehicle antenna apparatus and the position of the user riding in the vehicle may vary from each other, and control the communicator to transmit the obtained phase information to the vehicle antenna apparatus.

In another embodiment, the server 1110 may obtain phase information by performing an operation through the neural network described above with reference to FIG. 10. Particularly, the server 1110 may train an AI model and store the trained AI model. The server 1110 may obtain the above phase information by using the trained AI model.

In general, in terms of the memory storage capacity, the operation processing speed, the collection capability of a training data set, and/or the like, the vehicle electronic apparatus 1120 may be restricted compared to the server 1110. Thus, after the server 1110 performs an operation requiring storage of a large amount of data and a large amount of computation, necessary data and/or an AI model to be used may be transmitted to the vehicle electronic apparatus 1120 through the communication network. Then, the vehicle antenna apparatus (e.g., 160, 200, or 300) may rapidly and easily perform a necessary operation without a processor having a large-capacity memory and a fast operation capability by receiving and using the necessary data and/or the AI model through the server.

In another embodiment, the server 1110 may include the neural network 1010 described above with reference to FIG. 10. Particularly, the neural network 1010 included in the server 1110 may perform an operation for obtaining the above phase information.

The server 1110 may transmit the phase information obtained by performing an operation through the neural network, to the vehicle electronic apparatus 1120 through a wireless network 1101. Based on the phase information received from the server 1110, the vehicle electronic apparatus 1120 may adjust the phase of at least one radio wave signal such that the position of the radiation pattern formed by at least one radio wave signal output from a plurality of antenna elements included in the array antenna and the position of the user riding in the vehicle may vary from each other.

Figure 12:
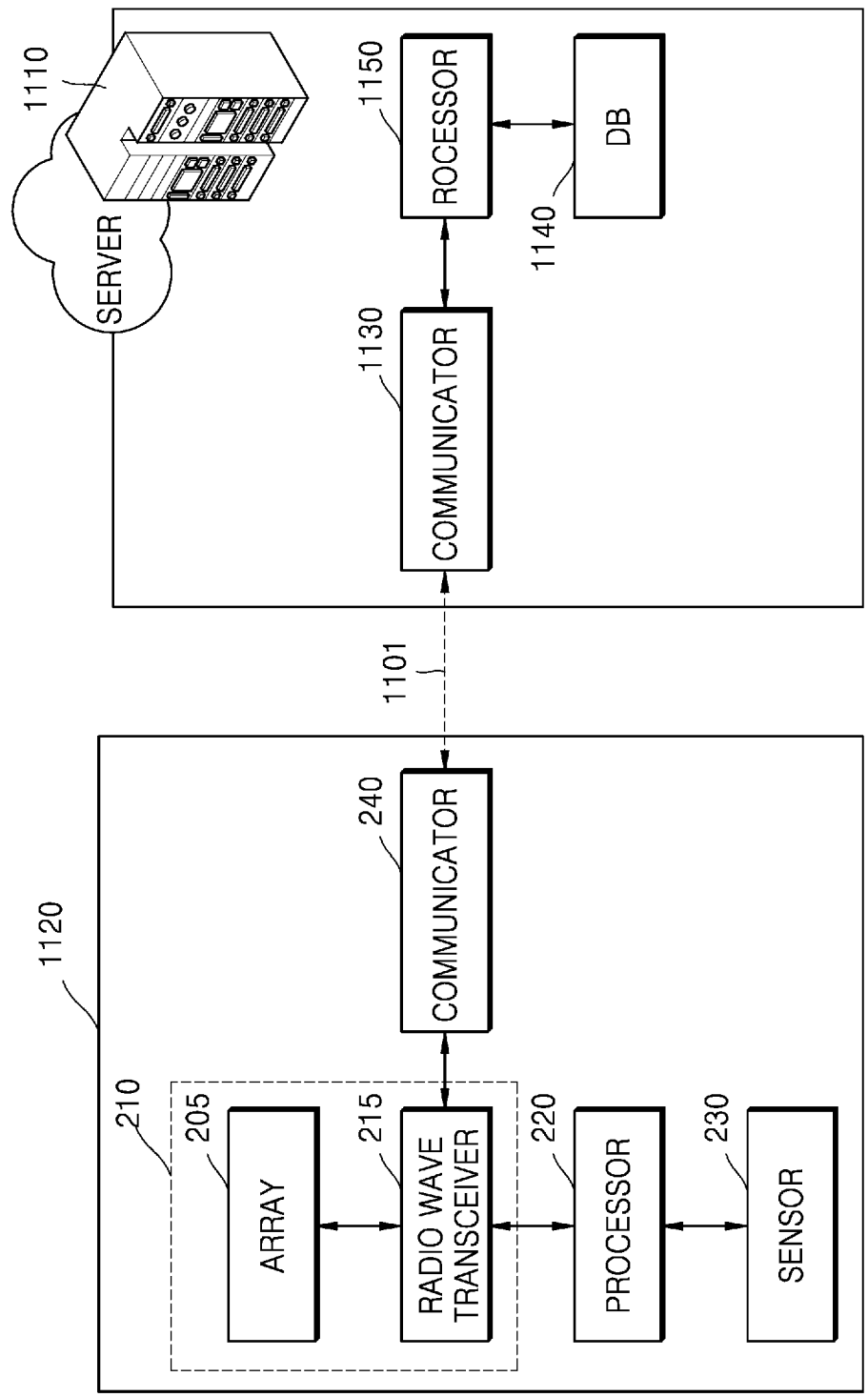
FIG. 12 is a diagram for describing FIG. 11 in detail according to an embodiment of the disclosure.

FIG. 12 is a diagram for describing FIG. 11 in detail according to an embodiment of the disclosure.

Referring to FIG. 12, the same components as those in FIGS. 3 and 11 are denoted by the same reference symbols. Thus, in describing the components of FIG. 12, redundant descriptions with the above descriptions will be omitted for conciseness.

Particularly, the vehicle electronic apparatus 1120 may be a vehicle antenna apparatus (e.g., 160, 200, or 300) according to an embodiment. In FIG. 12, a case where the vehicle electronic apparatus 1120 includes the same components (except for a communicator 240) as the vehicle electronic apparatus 300 described above with reference to FIG. 3 is illustrated as an example.

The vehicle electronic apparatus 1120 may further include a communicator 240, compared to the vehicle electronic apparatus 300 described above with reference to FIG. 3.

The communicator 240 may communicate with an external device (e.g., a server) through at least one wireless communication network 1101. The external device (not shown) may include a server (i.e., the server 1110) or the like that may perform at least one of the operations performed by the vehicle electronic apparatus 1120 or may transmit data or the like required by the vehicle electronic apparatus 1120.

Also, the communicator 240 may include at least one communication module such as a short-range communication module, a wired communication module, a mobile communication module, and/or a broadcast receiving module. The at least one communication module may include a tuner performing broadcast reception and/or a communication module capable of performing data transmission/reception through a network conforming to a communication standard such as a communication method performing communication by using Bluetooth, Wireless local area network (LAN) (WLAN) (wireless fidelity (Wi-Fi)), Wireless Broadband (WiBro), World Interoperability for Microwave Access (WiMAX), code-division multiple access (CDMA), wideband CDMA (WCDMA, Internet, third generation (3G), fourth generation (4G), fifth generation (5G), and/or millimeter wave (mmWave).

For example, the communicator 240 rapidly transmits/receives a large amount of data by performing communication by using millimeter wave (mmWave). Particularly, the vehicle may increase the safety of the vehicle and/or the user's convenience by rapidly receiving a large amount of data and rapidly providing user content (e.g., movie or music) and/or data necessary for the safety of the vehicle (e.g., data necessary for autonomous driving and/or data necessary for a navigation service).

Particularly, the mobile communication module included in the communicator 240 may communicate with another device (e.g., a server (not shown)) located at a long distance through a communication network conforming to a communication standard such as 3G, 4G, and/or 5G. The communication module performing communication with another device located at a long distance may be referred to as a "long-range communication module".

Also, although FIG. 12 illustrates that the communicator 240 and the array antenna 210 are separate components, the communicator 240 may include the array antenna 210. Particularly, at least one communication module included in the communicator 240 may include an array antenna 210 for transmitting/receiving radio waves.

Referring to FIG. 12, the server 1110 may include a communicator 1130 and a processor 1150. Also, the server 1110 may further include a database (DB) 1140.

The communicator 1130 may include one or more elements for performing communication with the vehicle electronic apparatus 1120. Because the detailed configuration of the communicator 1130 corresponds to the configuration of the communicator 240 described above, redundant descriptions thereof will be omitted for conciseness.

For example, the communicator 1130 includes at least one communication module communicating with another device (e.g., the vehicle electronic apparatus 1120) located at a long distance through a communication network conforming to a communication standard such as Internet, 3G, 4G, and/or 5G.

The processor 1150 may control an overall operation of the server 1110. For example, the processor 1150 performs desired operations by executing at least one instruction of the server 1110 and at least one of programs.

Also, the DB 1140 may include a memory (not shown) and store at least one of at least one instruction, programs, and data necessary for the server 1110 to perform a certain operation in the memory (not shown). Also, the DB 1140 may store data necessary for the server 1110 to perform an operation according to the neural network.

Particularly, in another embodiment, the server 1110 may store the neural network 1010 described above with reference to FIG. 10. The neural network 1010 may be stored in at least one of the processor 1150 and the DB 1140. The neural network 1010 included in the server 1110 may be a neural network that has been trained.

In another embodiment, the server 1110 may obtain the above phase information by using a neural network included therein and transmit the obtained phase information to the communicator 240 of the vehicle electronic apparatus 1120 through the communicator 1130.

Also, the server 1110 may transmit the trained neural network to the communicator 240 of the vehicle electronic apparatus 1120 through the communicator 1130. Then, the vehicle electronic apparatus 1120 may obtain and store the trained neural network and may obtain desired output data through the neural network.

The vehicle antenna apparatus control method 400, 800, or 900 according to another embodiment may be stored in a computer-readable recording medium by being implemented in the form of program commands that may be performed by various computer means. Also, another embodiment of the disclosure may be a computer-readable recording medium having stored therein one or more programs including instructions for executing the vehicle antenna apparatus control method 400, 800, or 900.

The computer-readable recording medium may include program commands, data files, and data structures either alone or in combination. The program commands recorded on the computer-readable recording medium may be those that are especially designed and configured for the disclosure, or may be those that are known and available to computer programmers of ordinary skill in the art. Examples of the computer-readable recording medium include magnetic media such as hard disks, floppy disks, or magnetic tapes, optical media such as compact disc (CD)-read-only memories (ROMs) or digital versatile discs (DVDs), and magneto-optical media such as floptical disks, and hardware devices such ROMs, random-access memories (RAMs), or flash memories specially configured to store and execute program commands. Examples of the program commands include machine language codes that may be generated by a compiler, and high-level language codes that may be executed by a computer by using an interpreter.

A machine-readable storage medium may be provided in the form of a non-transitory storage medium. The term "non-transitory" may mean that the storage medium is a tangible device and does not include signals (e.g., electromagnetic waves), and may mean that data may be permanently or temporarily stored in the storage medium. For example, the "non-transitory storage medium" includes a buffer in which data is temporarily stored.

According to another embodiment, the vehicle antenna apparatus control method 400, 800, or 900 according to various embodiments described herein may be included and provided in a computer program product. The computer program product may be traded as a product between a seller and a buyer. The computer program product may be distributed in the form of a machine-readable storage medium (e.g., a compact disc read only memory (CD-ROM)) or may be distributed (e.g., downloaded or uploaded) online through an application store (e.g., Play Store™) or directly between two user devices (e.g., smartphones). In the case of online distribution, at least a portion of the computer program product (e.g., a downloadable app) may be at least temporarily stored or temporarily generated in a machine-readable storage medium such as a memory of a manufacturer server, a memory of an application store server, or a memory of a relay server.

Particularly, it may be implemented as a computer program product including a recording medium having stored therein a program for performing the vehicle antenna apparatus control method 400, 800, or 900 according to another embodiment.

While the disclosure has been shown and described with reference to various embodiments thereof, it will be understood by those of skilled in the art that various changes in form and details may be made therein without departing from the spirit and scope of the disclosure as defined by the appended claims and their equivalents.

What is claimed is:

1. A vehicle antenna apparatus installed in a vehicle, the vehicle antenna apparatus comprising:
an array antenna comprising a plurality of antenna elements;
at least one processor configured to perform at least one instruction; and
a sensor configured to detect a position of a user riding in the vehicle,
wherein at least one the processor, when executing the at least one instruction, is further configured to:
based on a sensing result of the sensor, obtain information about the position of the user,
based on the information about the position of the user, determine whether a position of a radiation pattern formed by at least one radio wave signal output from the plurality of antenna elements and the position of the user overlap each other,
based on the information about the position of the user in the vehicle and determining that the position of the radiation pattern in the vehicle and the position of the user in the vehicle overlap each other, adjust a phase of the at least one radio wave signal such that a first area in a three-dimensional (3D) space corresponding to the position of the radiation pattern formed by the at least one radio wave signal and a second area in the 3D space corresponding to the position of the user riding in the vehicle do not overlap each other, and
control the array antenna to output the at least one phase-adjusted radio wave signal, and
wherein the phase of the at least one radio wave signal is adjusted such that a beam radiated into the 3D space corresponding to the position of the user riding in the vehicle is adjusted to be radiated to an area excluding the 3D space corresponding to the position of the user riding in the vehicle.

2. The vehicle antenna apparatus of claim 1, wherein the at least one processor, when executing the at least one instruction, is further configured to:
control to change a radio wave radiation direction of the array antenna by adjusting a phase of each of a plurality of radio wave signals to be respectively output from the plurality of antenna elements based on the information about the position of the user.

3. The vehicle antenna apparatus of claim 1, wherein the at least one processor, when executing the at least one instruction, is further configured to:
maintain the phase of the at least one radio wave signal at a previous set value when the position of the radiation pattern and the position of the user do not overlap each other.

4. The vehicle antenna apparatus of claim 1, wherein the at least one processor, when executing the at least one instruction, is further configured to:
synchronize a first coordinate system that is a 3D coordinate system for representing the position of the user and a second coordinate system that is a 3D coordinate system for representing a position of the at least one radio wave signal, and
compare a first coordinate value corresponding to the position of the user and a second coordinate value corresponding to the radiation pattern by using the synchronized first coordinate system and second coordinate system.

5. The vehicle antenna apparatus of claim 1, wherein the sensor comprises at least one of:
a time-of-flight (TOF) sensor,
a light detection and ranging (LIDAR) sensor,
a radio detection and ranging (RADAR) sensor,
a plurality of proximity sensors attached at different positions in the vehicle, or
a seat sensor located in the vehicle.

6. The vehicle antenna apparatus of claim 1, wherein the array antenna is formed as a phased array antenna located under a metal panel of the vehicle.

7. The vehicle antenna apparatus of claim 1, wherein the at least one processor, when executing the at least one instruction, is further configured to:
based on the sensing result of the sensor, determine whether the position of the user changes from a first position, and
when it is determined that the position of the user changes from the first position to a changed position, readjust the phase of the at least one radio wave signal such that the position of the radiation pattern and the changed position of the user do not overlap each other.

8. The vehicle antenna apparatus of claim 7, wherein the at least one processor, when executing the at least one instruction, is further configured to:
determine whether the position of the user changes by a threshold value or more when changing from the first position to the changed position, and
when it is determined that the position of the user changes by the threshold value or more, readjust the phase of the at least one radio wave signal such that the position of the radiation pattern and the changed position of the user vary from each other.

9. The vehicle antenna apparatus of claim 1,
wherein the at least one processor, when executing the at least one instruction, is further configured to:
when an electromagnetic wave absorption rate corresponding to an area where the radiation pattern and the user overlap each other is greater than a limit value, readjust the phase of the at least one radio wave signal such that the electromagnetic wave absorption rate corresponding to the area is less than or equal to the limit value,
wherein the area includes a body part of the user exposed to an electromagnetic wave by the radiation pattern, and
wherein the electromagnetic wave absorption rate corresponds to an amount of electromagnetic wave energy absorbed by a mass of a human body of the user.

10. A method performed by a vehicle antenna apparatus installed in a vehicle and including an array antenna having a plurality of antenna elements, the method comprising:
based on a sensing result of a sensor detecting a position of a user riding in the vehicle, obtaining information about the position of the user;
based on the information about the position of the user, determining whether a position of a radiation pattern formed by at least one radio wave signal output from the plurality of antenna elements and the position of the user overlap each other;
based on the information about the position of the user in the vehicle and determining that the position of the radiation pattern in the vehicle and the position of the user in the vehicle overlap each other, adjusting a phase of the at least one radio wave signal such that a first area in a three-dimensional (3D) space corresponding to the position of the radiation pattern formed by the at least one radio wave signal and a second area in the 3D space corresponding to the position of the user riding in the vehicle do not overlap each other; and controlling the array antenna to output the at least one phase-adjusted radio wave signal, wherein the phase of the at least one radio wave signal is adjusted such that a beam radiated into the 3D space corresponding to the position of the user riding in the vehicle is adjusted to be radiated to an area excluding the 3D space corresponding to the position of the user riding in the vehicle.

11. The method of claim 10, further comprising:

synchronizing a first coordinate system that is a 3D coordinate system for representing the position of the user and a second coordinate system that is a 3D coordinate system for representing a position of the at least one radio wave signal; and comparing a first coordinate value corresponding to the position of the user and a second coordinate value corresponding to the radiation pattern by using the synchronized first coordinate system and second coordinate system.

12. The method of claim 11, further comprising:

based on determining that there is an overlap between the radiation pattern and the user, adjusting the phase of the at least one radio wave signal such that the position of the radiation pattern and the position of the user do not overlap each other.

13. The method of claim 12, further comprising:

based on the adjusting of the phase of the at least one radio wave signal, outputting the at least one radio wave signal with the phase adjusted.

14. The method of claim 10, further comprising:

determining whether the position of the user changes from a first position to a changed position; and based on determining that the position of the user changes, readjusting the phase of the at least one radio wave signal such that the position of the radiation pattern and the changed position of the user do not overlap each other.

15. A server comprising:

a communicator configured to communicate with a vehicle antenna apparatus installed in a vehicle; and at least one processor configured to perform at least one instruction, wherein the at least one processor, when executing the at least one instruction, is further configured to:

receive information about a position of a user riding in the vehicle, the information corresponding to a sensing result of a sensor detecting the position of the user, based on the information about the position of the user, determine whether a position of a radiation pattern formed by at least one radio wave signal output from a plurality of antenna elements included in an array antenna of the vehicle antenna apparatus and the position of the user overlap each other, based on the information about the position of the user in the vehicle and determining that the position of the radiation pattern in the vehicle and the position of the user in the vehicle overlap each other, obtain phase information comprising phase values of at least one radio wave signal set such that a first area in a three-dimensional (3D) space corresponding to the position of the radiation pattern formed by the at least one radio wave signal and a second area in the 3D space corresponding to the position of the user riding in the vehicle do not overlap each other, the obtaining of the phase information including obtaining the phase information so that a phase value allows for a beam radiating into 3D space of the vehicle be adjusted so as to radiate the beam to an area excluding the second area in the 3D space corresponding to the position of the user riding in the vehicle, and control the communicator to transmit the phase information to the vehicle antenna apparatus.

16. The vehicle antenna apparatus of claim 1, wherein the at least one processor, when executing the at least one instruction, is further configured to:

based on determining that the position of the radiation pattern and the position of the user overlap each other, control to output an image representing a degree of overlap between the position of the radiation pattern and the position of the user on a display of the vehicle.

17. The vehicle antenna apparatus of claim 9, wherein the at least one processor, when executing the at least one instruction, is further configured to:

based on the limit value of the electromagnetic wave absorption rate corresponding to a mass of a human body in the area not being exceeded, refrain from adjusting the phase.

18. The vehicle antenna apparatus of claim 9, wherein the at least one processor, when executing the at least one instruction, is further configured to:

based on the limit value of the electromagnetic wave absorption rate corresponding to a mass of a human body in the area being exceeded, readjust the phase of the at least one radio wave signal such that the electromagnetic wave absorption rate corresponding to the area is less than or equal to the limit value.

* * * * *